Nov. 28, 1939. R. G. TURNER Re. 21,283

WEFT REPLENISHING SHUTTLE CHANGING LOOM Orig. 2,054,171

Original Filed June 12, 1930 8 Sheets-Sheet 1

INVENTOR
RICHARD G. TURNER
Smith Pat. Fry & Hawley
ATTORNEYS

Nov. 28, 1939. R. G. TURNER Re. 21,283
WEFT REPLENISHING SHUTTLE CHANGING LOOM
Original Filed June 12, 1930 8 Sheets-Sheet 2
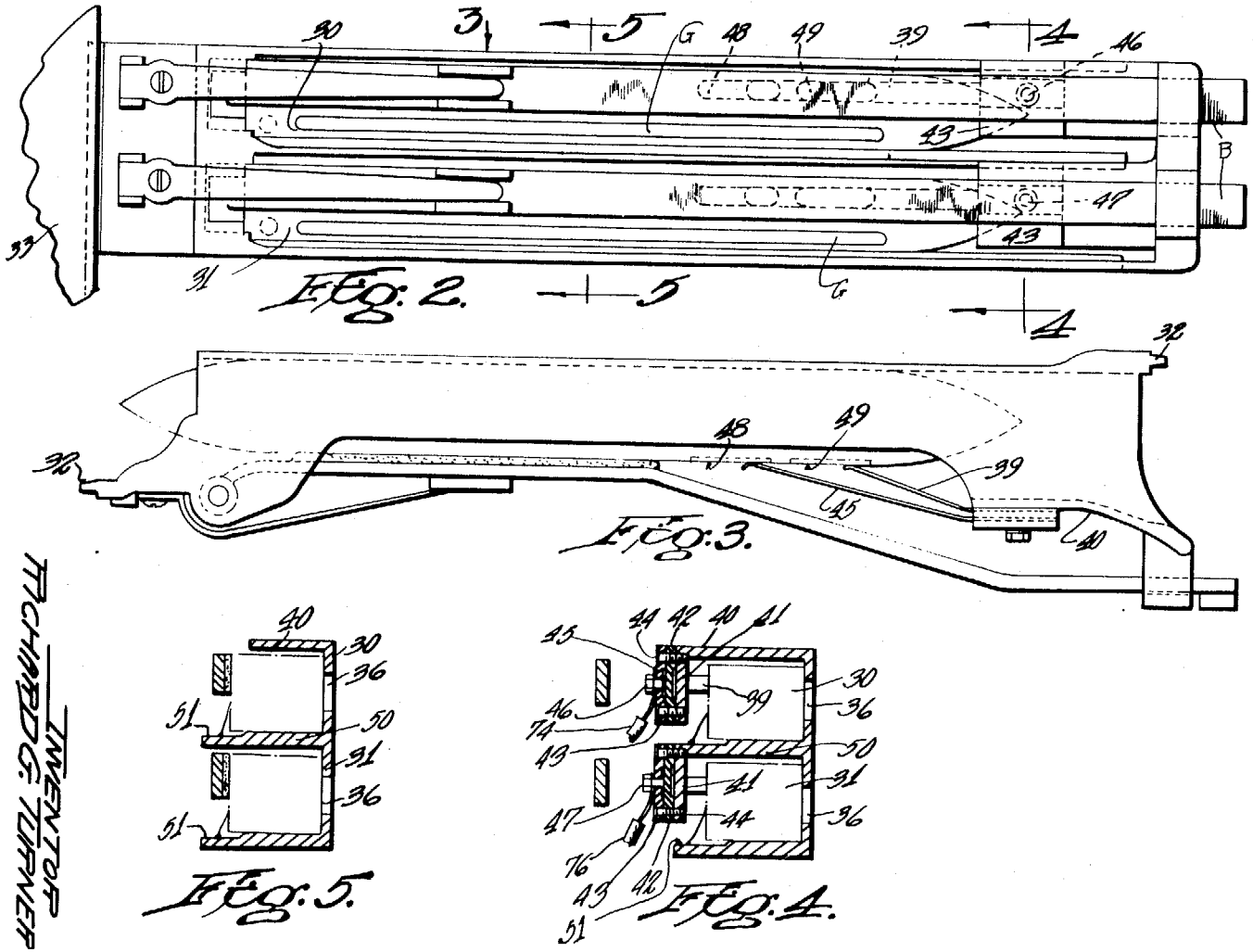
INVENTOR
RICHARD G. TURNER
Van Antwerpen, Hayes & Hawley
ATTORNEYS Nov. 28, 1939. R. G. TURNER Re. 21,283
WEFT REPLENISHING SHUTTLE CHANGING LOOM
Original Filed June 12, 1930 8 Sheets-Sheet 3
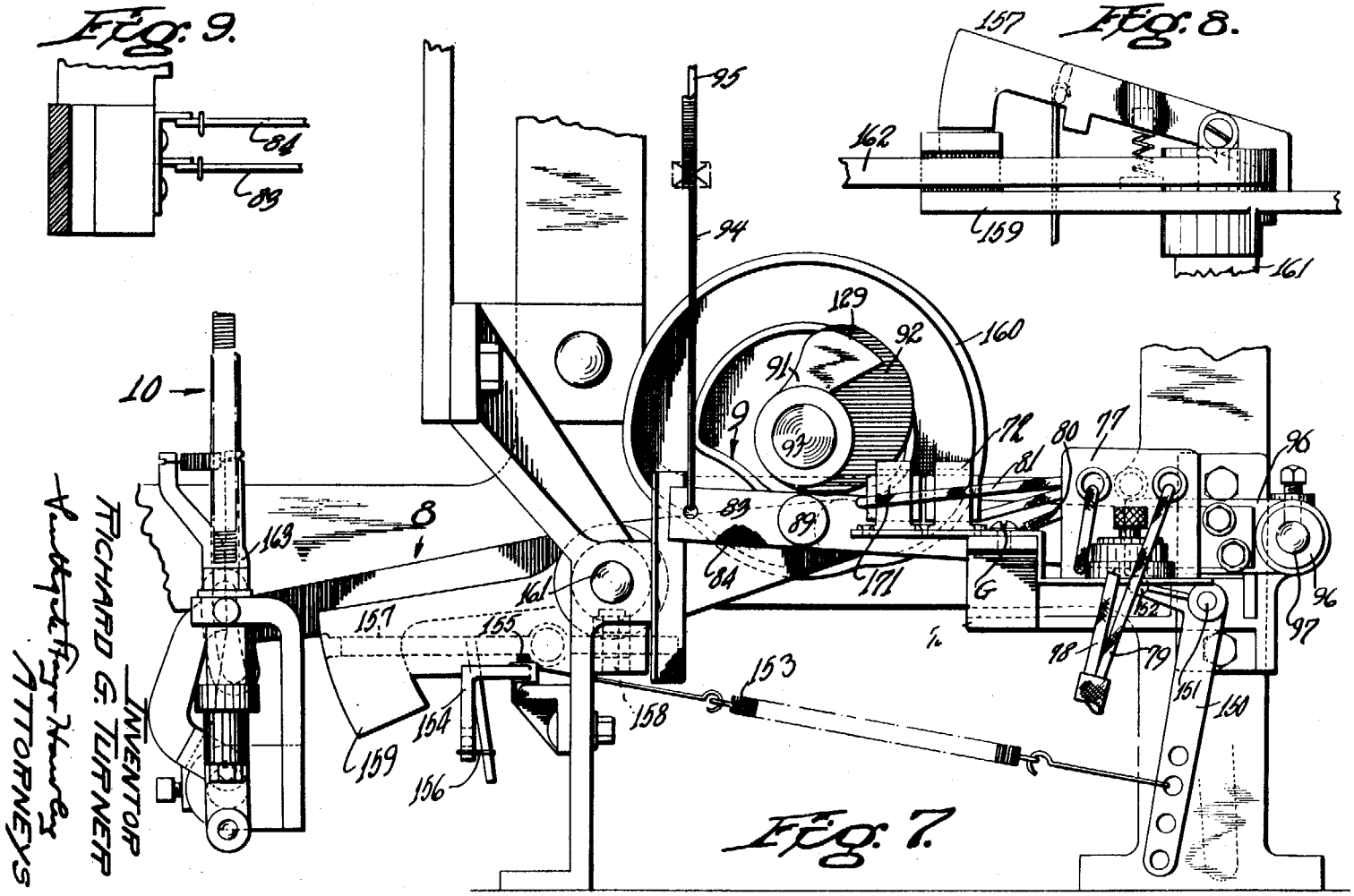

Nov. 28, 1939. R. G. TURNER Re. 21,283
WEFT REPLENISHING SHUTTLE CHANGING LOOM
Original Filed June 12, 1930 8 Sheets-Sheet 4
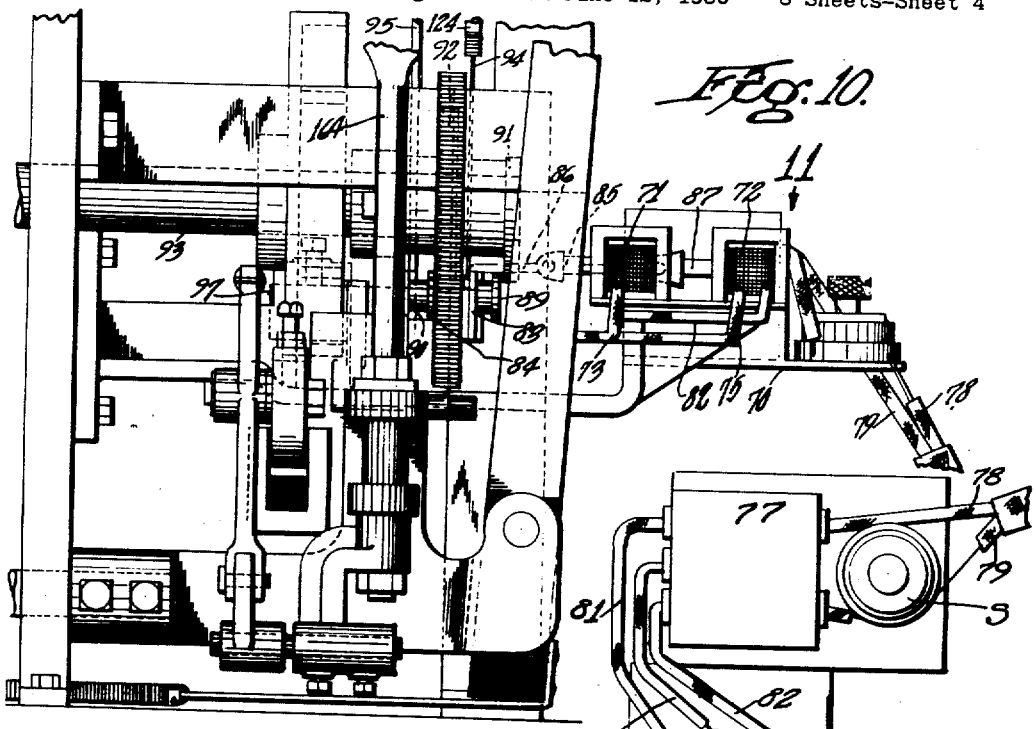
Fig. 10.
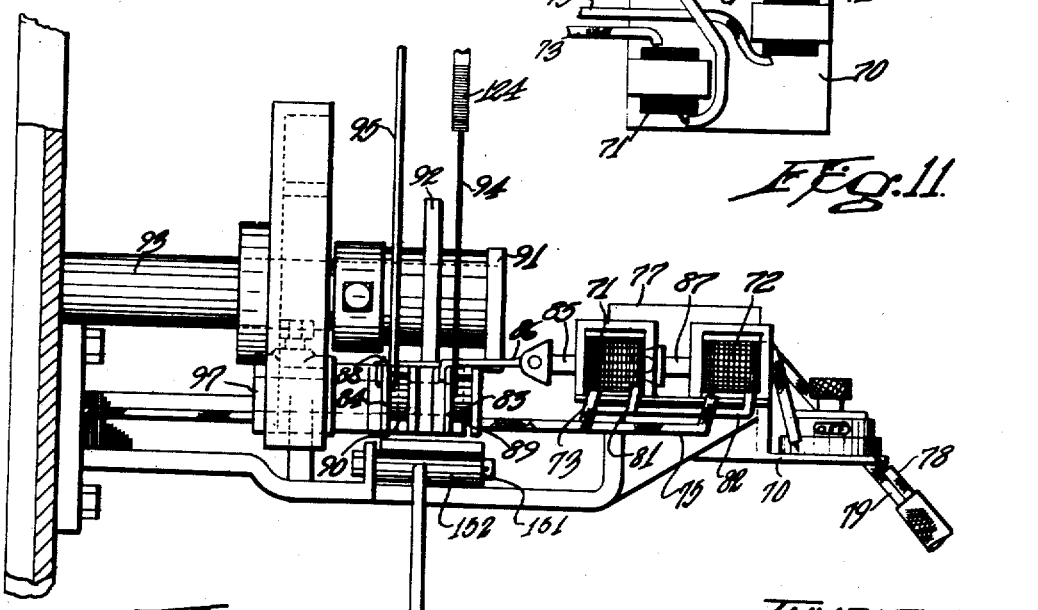
Fig. 11.
Fig. 12.
INVENTOR
RICHARD G. TURNER
Southgate Fraser & Hawley
ATTORNEYS

E

Nov. 28, 1939. R. G. TURNER Re. 21,283

WEFT REPLENISHING SHUTTLE CHANGING LOOM

Original Filed June 12, 1930 8 Sheets-Sheet 5

INVENTOR
RICHARD G. TURNER
Southgate Fogg & Hawley
ATTORNEYS

Nov. 28, 1939. R. G. TURNER Re. 21,283
WEFT REPLENISHING SHUTTLE CHANGING LOOM
Original Filed June 12, 1930 8 Sheets-Sheet 6
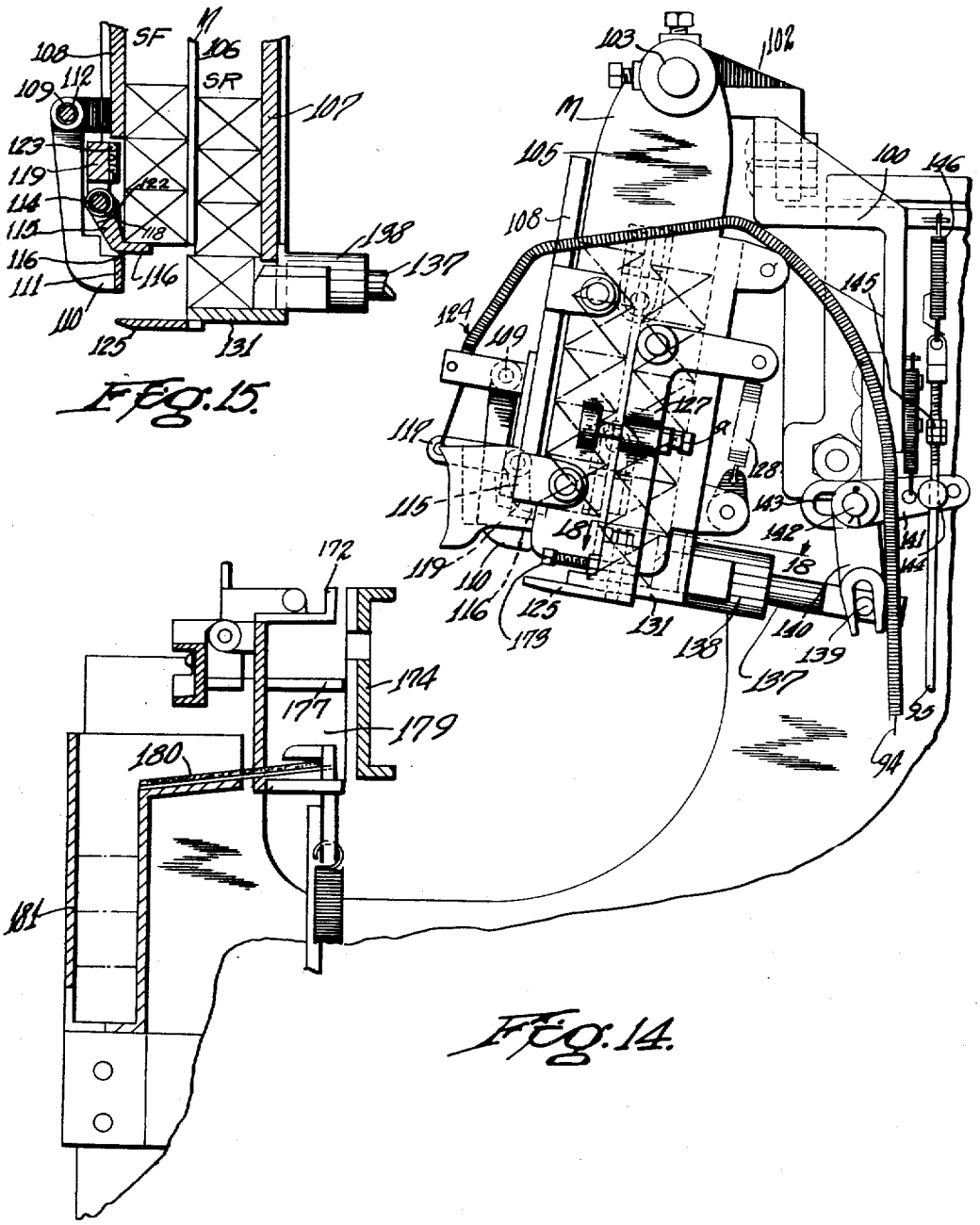
INVENTOR
RICHARD G TURNER
Southgate Fryer Hawley
ATTORNEYS

139. TEXTILES, WEAVING.
232

Nov. 28, 1939. R. G. TURNER Re. 21,283

WEFT REPLENISHING SHUTTLE CHANGING LOOM

Original Filed June 12, 1930 8 Sheets-Sheet 7

INVENTOR
RICHARD G. TURNER
Smith, Gatchel, Fay & Hawley
ATTORNEYS

Nov. 28, 1939. R. G. TURNER Re. 21,283

WEFT REPLENISHING SHUTTLE CHANGING LOOM

Original Filed June 12, 1930 8 Sheets-Sheet 8

INVENTOR
RICHARD G. TURNER
Pennington Fryer Hawley
ATTORNEYS

19. TEXTILES, WEAVING.
232

Reissued Nov. 28, 1939

Re. 21,283

UNITED STATES PATENT OFFICE 21,283

WEFT REPLENISHING SHUTTLE CHANGING LOOM

Richard G. Turner, Worcester, Mass., assignor to Crompton & Knowles Loom Works, Worcester, Mass., a corporation of Massachusetts Original No. 2,054,171, dated September 15, 1936, Serial No. 460,746, June 12, 1930. Application for reissue September 9, 1937, Serial No. 163,056

61 Claims. (Cl. 139—232)

Figure 1:
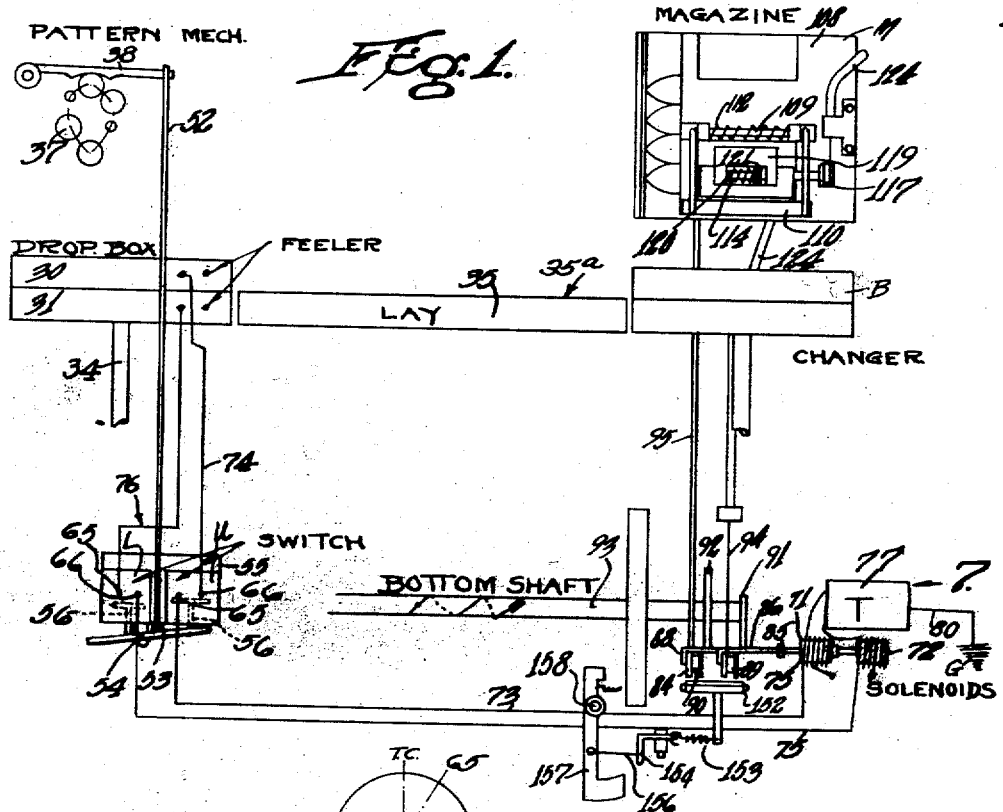

This invention relates to shuttle changing looms operating with two or more kinds of filling, and it is the general object of the invention to provide such a loom capable of weaving fine fabrics at a high rate of speed.

Heretofore, weft replenishment in fancy or multi-shuttle looms running at commercial speeds has been limited to bobbin changers, but with such mechanisms the thread of the outgoing bobbin may be whipped into the shed to cause an imperfection in the cloth. Also, the shuttle tension on the weft during the first pick after transfer is sufficiently different from that on subsequent picks to cause a mark in the cloth. These defects are minimized on shuttle changing looms, but commercial forms of the latter have in the past been limited to a single color of filling. It is an important object of the invention to provide a shuttle changing loom retaining the advantages inherent in the shuttle changer as regards weft control and adding the multi-color principle to secure diversity of weft.

In shuttle changers the weft can be placed in the shuttle by hand, making possible the use of paper or similar quills on which the weft is wound. Few mills make their own rayon, the majority of them buying this material from outside sources, and as quills are light they add but little to transportation costs. These advantages have not been attainable in fancy automatic looms in the past, but do exist in the loom described herein.

To simplify and reduce the number of parts I effect transfer of the different shuttles from a common transfer position to the lay by the same devices, the shuttles moving to the common position from the several stacks prior to the time of transfer. This latter result is achieved by having the common position adjacent each of the groups of shuttles, and moving a selected reserve shuttle from its group to transfer position with a minimum of motion.

An important object of the invention is to provide the detector and changer mechanisms on opposite sides of the loom, indicating weft exhaustion on one pick and transferring on the next pick without introducing change-delaying or indication-storing devices. To achieve this result it is necessary to have as long a time as possible lapse between indication of weft exhaustion and actual change of shuttles. Also, with the electrical devices which I use a circuit can be closed through an idle exhausted shuttle on the drop box side of the loom at the wrong time unless steps be taken to prevent such an occurrence. I accomplish both of these results by putting the electric circuits under control of the pattern mechanism.

Each idle exhausted shuttle becomes a potential initiator of changing operations, and since it is possible for two exhausted shuttles to be in the drop boxes at the same time with possibility of closing two circuits and resultant color confusion at the magazine, a switch is used, to be operated by the pattern chain and effective to close but one circuit at a time, irrespective of the number of empty shuttles in the drop boxes, the circuit closed corresponding to the shuttle next to become active.

When weaving crepe or other fabrics calling for two picks of one and then two picks of another color, a special condition arises in that each shuttle becomes active every alternate pick. The circuit through an idle exhausted shuttle is closed as soon as the pattern mechanism completes its movement, and the shuttle changing devices can therefore be set to begin operations immediately thereafter, without waiting for the arrival at the drop boxes of the active shuttle. This is true because it is known in advance that the shuttle approaching the drop boxes will not be active on the next pick and changing operations need not await determination of the condition of weft in the active shuttle. In this way added time is gained for the operation of the changing mechanism.

Further objects of the invention are, to effect shuttle replacement when the lay is at back center, to place the electrical contacts above the thread groove of the shuttle to avoid entanglement with the weft, to provide a temporary shuttle support between the several groups of shuttles and the lay, the support being yieldable in a direction other than that in which any shuttle moves toward it, to place a thread holder common to all the groups between the magazine and the center of the loom, to arrange a stationary binder under the lay so it will not catch the weft ends of shuttles moving from the magazine to the lay, and to locate the lowest front reserve shuttle above the common transfer position to provide clearance for the weft ends of the rear shuttles.

Briefly, my improved shuttle changing loom operates with substantially similar shuttles any one of which may remain active for any number of picks independently of the period of activity of the other shuttles, has a stationary multicolor shuttle magazine at one side of the loom with detecting mechanism at the opposite or drop box side, employs electrical circuits to be closed no later than the boxing at the drop box side of the active shuttle, and uses the pattern mechanism to prevent an idle exhausted shuttle from indicating a change if said shuttle is to remain idle.

With these and other objects in view which will appear as the description proceeds, my invention resides in the combination and arrangement of parts hereinafter described and set forth in the claims.

Figure 24:
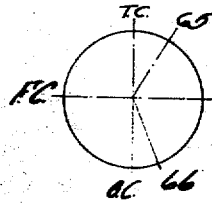
Figure 6:
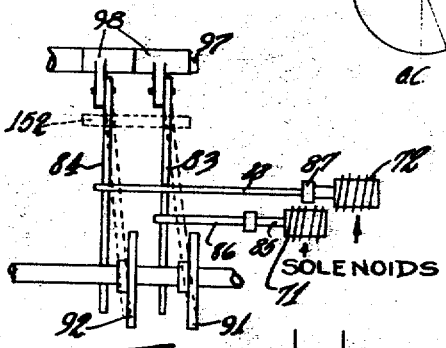
Figure 22:
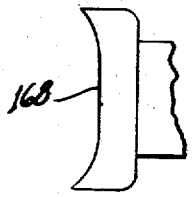
Figure 23:
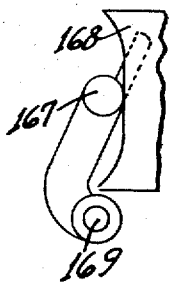
Figure 27:
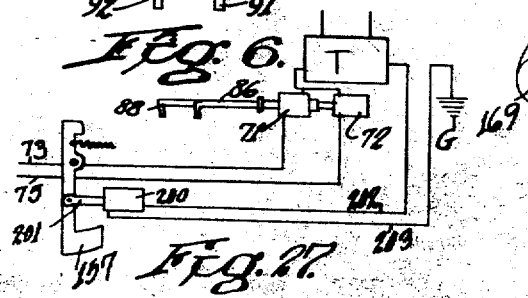
Figure 13:
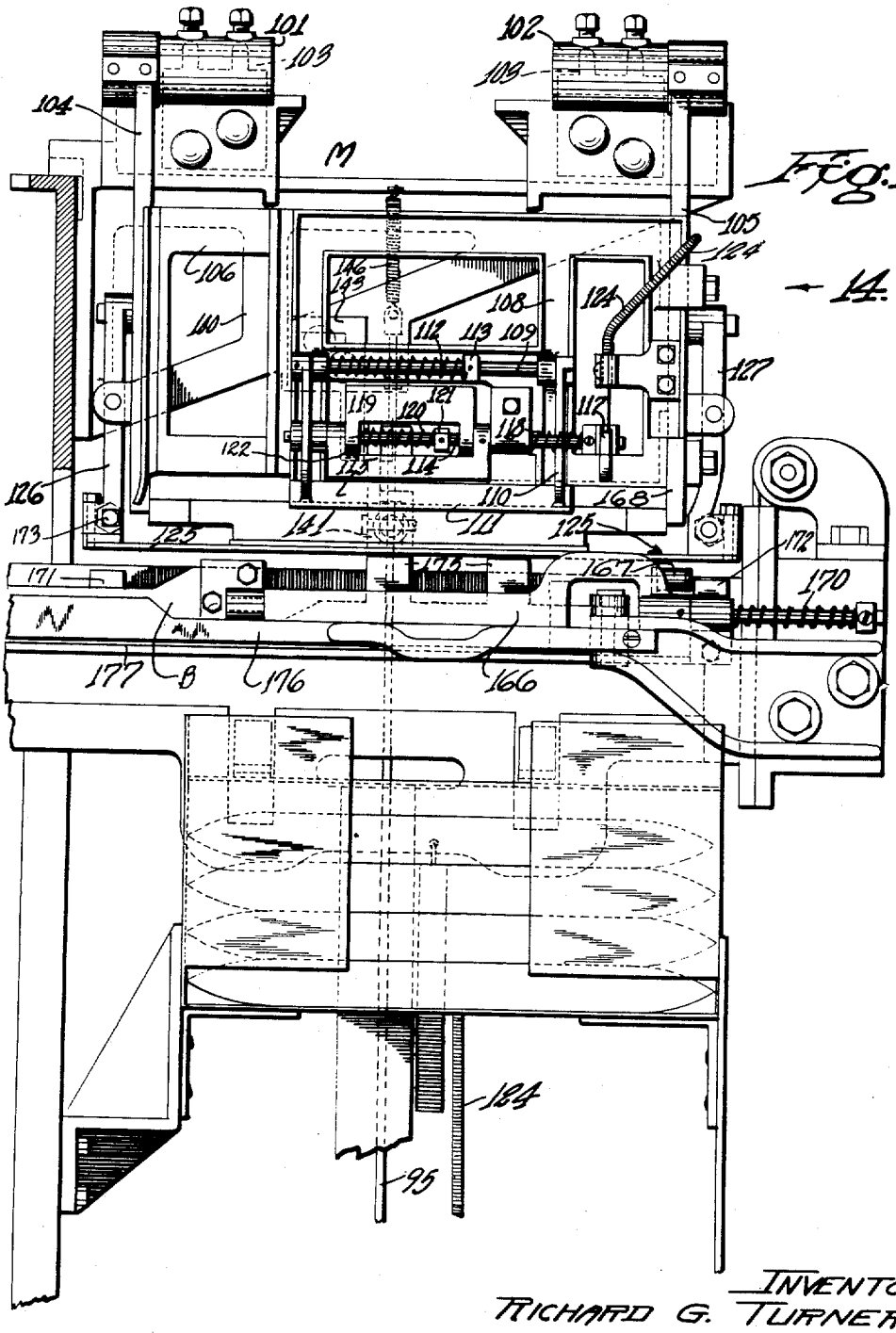
Figure 16:
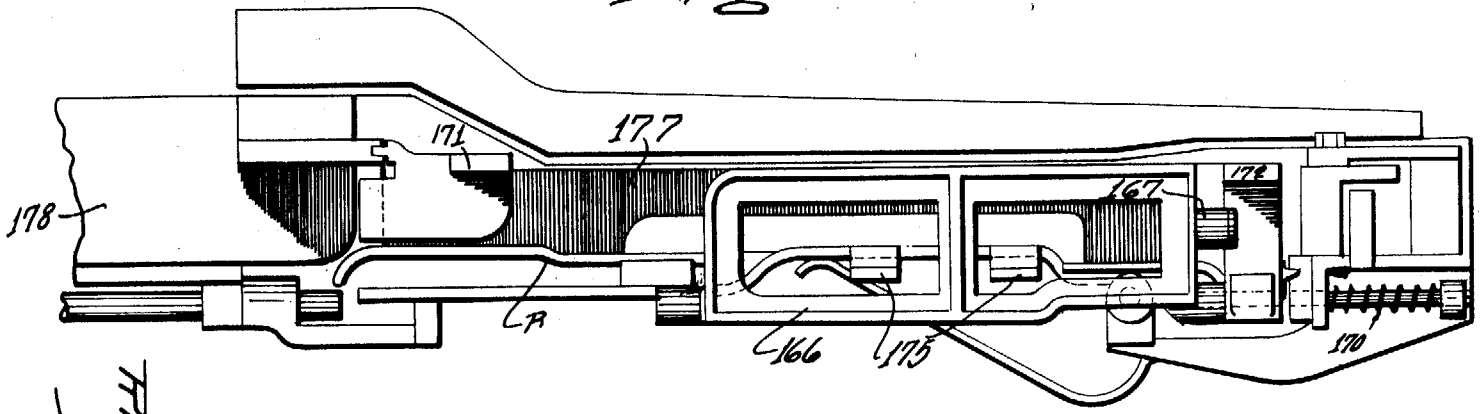
Figure 17:
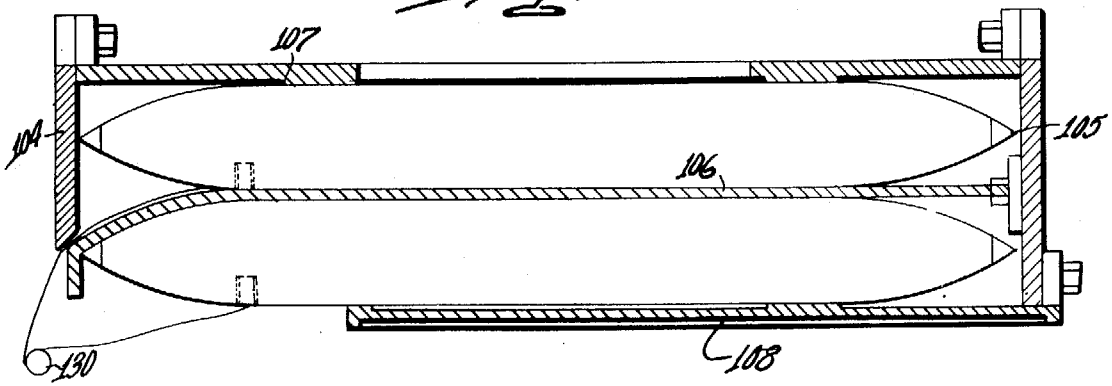
Figure 18:
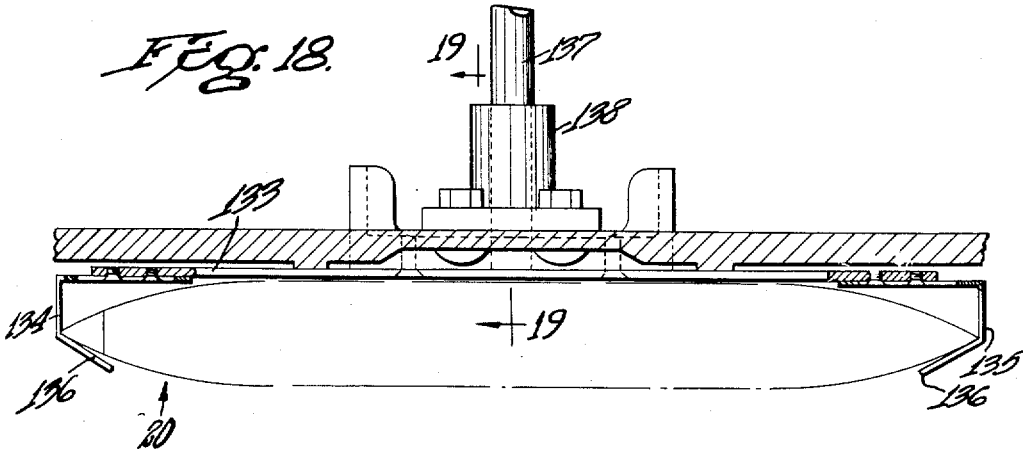
Figure 19:
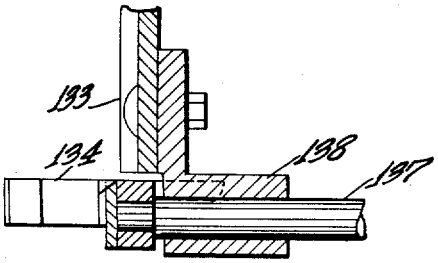
Figure 20:
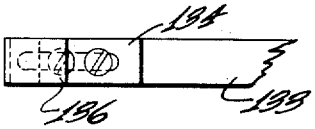
Figure 26:
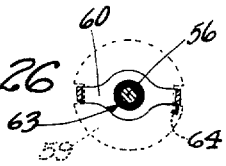
Figure 25:
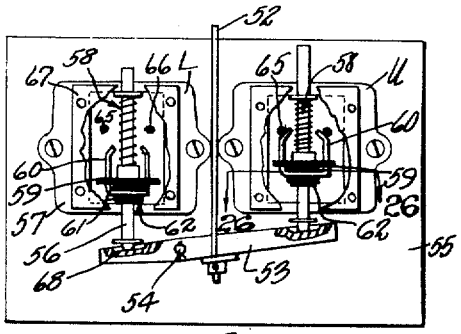
Figure 21:
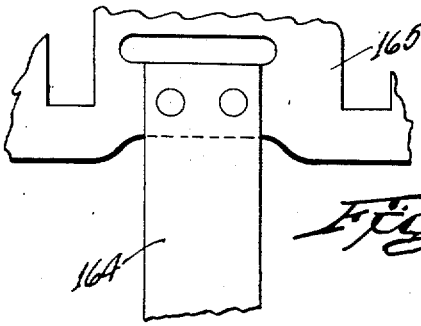

In the accompanying drawings, wherein a convenient embodiment of my invention is set forth, Fig. 1 is a diagrammatic view showing both ends of the loom with the detecting and replenishing device on opposite sides thereof, Fig. 2 is a front elevation of the drop boxes on the detector or left hand side of the loom, showing a shuttle on each box, Fig. 3 is a top plan view taken in the direction of arrow 3, Fig. 2, Figs 4 and 5 are detailed vertical sections on lines 4—4 and 5—5, respectively, of Fig. 2, Fig. 6 is a diagrammatic top plan view of the cam levers and operating solenoids therefor, Fig. 7 is an end elevation of the lower part of the loom on the magazine side taken in the direction of arrow 7, Fig. 1, showing the cams and levers for operating the shuttle advancing devices of the magazine, Fig. 8 is a top plan view taken in the direction of arrow 8, Fig. 7, showing the key or arm which raises the boxes on the magazine end of the loom, Fig. 9 is a detail top plan view showing the guide for the yielding cam levers, Fig. 10 is a front elevation of the lower end of the box lifting device on the magazine end of the loom taken in the direction of arrow 10, Fig. 7, Fig. 11 is a detailed top plan view taken in the direction of arrow 11, Fig. 10, showing the electrical connections for the solenoids, Fig. 12 is a view similar to Fig. 10 with certain parts removed and showing the connections between the solenoids and the cam levers, Fig. 13 is a front elevation of the upper part of the shuttle changing side of the loom, showing the magazine for holding the reserve shuttles, Fig. 14 is an end elevation, partly in section, looking in the direction of arrow 14, Fig. 13, Fig. 15 is a detailed vertical section through the lower part of the magazine, showing the two stacks of reserve shuttles together with the two shuttle advancers, one for each stack, Fig. 16 is a top plan view of the lay and rising box under the magazine, Fig. 17 is an enlarged horizontal section through the lower part of the magazine, Fig. 18 is a detailed horizontal section on an enlarged scale on line 18—18 of Fig. 14, showing the shuttle advancer for the rear stack of bobbins, Fig. 19 is a vertical section on line 19—19 of Fig. 18, Fig. 20 is a detail front elevation looking in the direction of arrow 20, Fig. 18, showing one of the shuttle retaining clips, Fig. 21 is a detailed front elevation of the connections between the rising boxes on the magazine end and an improved form of box lifter rod, Figs. 22 and 23 are diagrammatic views showing the relation between the top of the rising box on the lay on the magazine end of the loom together with the operating cam therefor, Fig. 24 is a diagrammatic view showing the time relation between the pattern chain and certain switching mechanism to be described, Fig. 25 is a side elevation of the switches controlled by the pattern chain, Fig. 26 is a detail horizontal section on line 26—26 of Fig. 25, and Fig. 27 is a detail diagrammatic view showing a modification of part of the matter shown in Fig. 1.

The loom comprises a pair of electrical weft detectors at the drop box or left hand side of the loom which coact with electrically equipped similar shuttles and operate in conjunction with a pattern controlled switch to determine which of two solenoids on the opposite side of the loom shall be energized for the purpose of swinging one or another of two levers under depressing cams. These levers are connected to shuttle advancers on a two-celled magazine and the actual changing mechanism is carried in part by the lay and in part by stationary structure.

The description which follows will start with the detector mechanism at the drop box end and follow through the effect of an indication of weft exhaustion, showing finally how the shuttle which is depleted will be replaced by a full shuttle carrying the same kind or character of filling.

*Drop boxes and detector mechanism*

Referring to Figs. 1 to 5, there is shown a gang of shuttle boxes having two cells 30 and 31. Each cell is provided with guide tongues 32 of the usual form to cooperate with grooved guides, one of which is shown at 33 in Fig. 2. The boxes may be raised or lowered by any approved form of box motion acting through a box lifter rod 34 to bring either of said boxes in alignment with the shuttle race 35*a* of the lay 35. The active shuttle may be propelled by means of any form of picker not shown extending through slots 36 in the back of the gang of boxes.

A pattern chain 37, having a movement preferably every alternate pick, acts upon a pattern lever 38 to determine the sequence of movements of the shuttle boxes, the pattern chain being of ordinary construction and in the usual time with respect to other loom parts. The shuttle boxes are moved so that either box may be in alignment with the lay for any desired even number of picks, depending upon the pattern, and each box has a shuttle binder B.

The weft detecting mechanism comprises a pair of brush or spring electric contacts for each box, the top pair being shown particularly in Fig. 3 with the shorter contact 39 being secured to the metallic frame 40 of the boxes and therefore being grounded to the loom. Each box has a vertical plate 41 against which lies an insulating plate 42. A second plate of insulating material 43 is held to the plate 41 by means of screws 44 and is grooved to receive the other or longer contact spring 45. By reason of the grooves shown in Fig. 4 the springs 39 and 45 are held in fixed horizontal position relatively to the lay. The upper spring 45 is electrically connected to binding post 46, whereas the lower corresponding spring is connected to binding post 47, and the shorter lower spring 39 is grounded as is the case with the shorter upper spring 39.

The shuttle has on the upper forward wall thereof a pair of substantially horizontally aligned contact plates 48 and 49 which are designed for engagement, respectively, with springs

TEXTILES: WEAVING.
232

45 and 39. As shown in Fig. 3 the contact 48 is shorter than the distance between the shuttle engaging portions of the springs 39 and 45 to prevent both of these springs from contacting with said plate 48 at the same time and thereby giving a false indication of weft exhaustion. The plates are separated and normally held out of electrical contact with each other by a sufficient supply of weft, but are electrically connected at weft exhaustion.

The plates 48 and 49 are both above the weft groove G, see Fig. 2, so that the filling at no time is required to pass near enough to the contacts 39 and 45 to be entangled with them.

As shown in Fig. 4 the shuttle box construction has a central web 50 the right hand part of which forms the supporting structure for the upper shuttle and the left hand part of which is low enough, as at 51, to be out of contact with the upper shuttle but provides a support for the filling, permitting the latter a certain amount of free motion on the support under the shuttle without being pinched by the latter. A similar construction is employed for the lower shuttle box.

When weft exhaustion occurs in any shuttle the corresponding spring contacts will be electrically connected through the shuttle, and any one of a plurality of circuits to be described can be closed if other conditions exist as set forth hereinafter. Any other approved form of electrical detector may be employed to close a circuit at an exhausted shuttle in the drop boxes.

*Pattern chain control of switches*

Inasmuch as a depleted shuttle in either drop box can have current flowing therethrough it becomes potentially an initiator of shuttle change. Since both shuttles may be on this end of the loom and exhausted at the same time, it is necessary to provide some means to prevent a temporarily idle exhausted shuttle from causing shuttle replacement, otherwise confusion in colors may result. To accomplish this result there is employed a pair of switches, one for each drop box, and I provide for having but one of these switches closed at a time. On any given pick of the loom the switch will be closed for that shuttle box which will be in active position on the next pick.

In carrying out this feature of the invention there is connected to the pattern lever 38 a depending rod 52 attached at its lower end to a lever 53 pivoted as at 54 to a fixed switch stand 55, see Figs. 1 and 25. Two switches U and L are provided for the upper and lower boxes 30 and 31, respectively, and each switch has a plunger 56 movable through a housing 57 fixed to the stand 55. A coiled spring 58 surrounds each plunger and pushes down on an insulator 59 slidable on the plunger. A spring contact member 60 is held between two insulator washers 61 below the insulator 59, and a pin 62 through the plunger limits down motion of the spring member and plunger. The plunger passes through an enlarged hole 63, Fig. 26, in the member 60, thereby keeping the latter out of contact with the plunger. Guide notches 64 in insulator 59 position the contact member relatively to the plunger and cause it to move against contacts 65 and 66 insulated from each other and from the top 67 of the housing.

The lever 53 has grooves 68 to receive the lower ends of the plungers, each plunger contacting with the lever preferably though not necessarily at all times. As seen in Fig. 25 pivot 54 is nearer switch L than switch U, so that the spring 58 of the latter exerts a greater turning moment around the pivot than does the other spring. In this way the lever 53 tends to turn in a right hand direction as viewed in Fig. 25 against the lifting action of pattern chain lever 38.

The parts are so proportioned that but one switch can be closed at a time, namely, the one corresponding to the next shuttle to be active, as will appear from a consideration of Fig. 24. The circle in this figure represents the path of the crank on the lay driving or top shaft, points FC, TC, RC and BC corresponding to the front, top, rear and bottom centers, respectively. The boxes ordinarily shift from bottom through front to top center, the period during which the warps cross. The pattern chain which controls the box shift must, therefore, complete its motion before bottom center, and this is accomplished in the ordinary box loom by having the pattern chain start its motion at some point as at 65 between top and rear centers and completing its movement at some point such as 66 between rear and bottom centers. It is seen, therefore, that rod 52 is given its complete movement, if it is to move at all, before the lay reaches bottom center and prior to the shifting of the boxes. As a matter of fact, rod 52 is found to move sufficiently to close the switches while the lay is in its rear position.

The pattern lever 38 which determines the sequence of movements of the boxes also controls the switch, so that no confusion of colors can result.

From the description given of the pattern chain control for the switches it will be understood that the switch corresponding to the shuttle next to move from the drop boxes toward the magazine will be closed prior to shifting movement of the shuttle boxes. It is an important further consideration that the switch corresponding to the idle shuttle is open.

*Solenoids and circuits*

The switches already described call for the delivery of a correct shuttle from the magazine by a plurality of electromagnetic devices, one device for each of the switches. These devices are shown more particularly in Figs. 1, 7, 10, 11 and 12 where it will be seen that a stand 70 supports solenoids 71 and 72. Solenoid 71 is connected by means of wire 73 to contact point 65 of switch U and is capable of connection by means of said switch U to its other contact 66, wire 74 and binding post 46 of the upper insulated contact spring 45 on box 30. In a similar way solenoid 72 is connected by wire 75 through the other switch L and wire 76 to the lower insulated contact spring 45. A transformer 77 fed by power lines 78 and 79 supplies current for the circuits and is controlled by a master switch S. The transformer is grounded to the frame by wire 80 and has a wire 81 connected to the solenoid 71 and a second wire 82 connected to the solenoid 72.

Shuttle advancers to be described are actuated by a pair of levers 83 and 84 which are controlled respectively by the solenoids 71 and 72. Solenoid 71 has a core 85 with a relatively short hook 86 pivoted thereto and positioned to lie over lever 83 so as to move the latter to the right as viewed in Fig. 12 when said solenoid 71 is energized. In a similar way the core 87 of solenoid 72 is pivoted to a relatively long hook 88 effective to move the other lever 84 to the right when the corresponding solenoid is energized.

Levers 83 and 84 are provided with rolls 89 and 90, respectively, which cooperate with short and dwell cams 91 and 92, respectively. These cams are both secured to the bottom shaft 93 of the loom and make a complete revolution in two picks of the loom. Lever 83 is connected to an upwardly extending pull wire 94, while lever 84 is connected to an upwardly extending rod 95.

Assuming that the upper shuttle is exhausted and on the drop box end of the loom with switch U closed, the following circuit will be closed: ground, upper grounded contact spring 39, plates 49 and 48 of the upper shuttle, upper insulated spring 45, binding post 46, wire 74, contact 66, spring member 60 and contact 65 of the closed switch, wire 73, solenoid 71, wire 81 to the transformer, and back to the ground through wire 80. Current flowing in this circuit will cause attraction of the short hook 86 and move the lever 83 under the short cam 91. In a similar way, if the lower shuttle be empty with switch L closed current will flow through wire 76, the closed switch and wire 75 to excite solenoid 72, so that lever 84 will be placed in operative relation with respect to its dwell cam 92.

The levers 83 and 84 may be made of flexible material and have their rear ends secured to rigid arms 96 which oscillate about fixed stud 97 and are carried by hubs 98 on said stud, see Figs. 6 and 7. By this construction the solenoids can be made amply strong to deflect the levers and move them from the full to the dotted line position shown in Fig. 6.

From the description given of the solenoids and circuits it will be seen that when one or the other of the shuttles is empty and on the drop box side of the loom ready to be picked toward the magazine, the lever corresponding thereto will be operatively related to its cam so that either the pull wire 94 or rod 95 will be depressed to actuate one or the other of the shuttle advancers to be described.

The time of closing the previously described circuit will depend upon whether the exhausted shuttle has been active on preceding picks or whether it has been idle and is returning to activity.

If the shuttle is to remain active after becoming exhausted, the pattern mechanism will remain unchanged and the switches will also remain unchanged. In order to complete the circuit, however, it is necessary for the shuttle to be sufficiently boxed to permit contact of the plates 48 and 49 with the contact brushes 39 and 45. This will ordinarily occur before the lay has reached bottom center, from which it will be seen that the indication is given relatively late when the depleted shuttle is to remain in action.

If, on the other hand, the indicated shuttle moves out of action immediately after becoming exhausted and is returned to action at a subsequent pick, there will be a change of the pattern chain and therefore an alternation of the switches immediately prior to its return to action, and as soon as the switches assume their new position the shuttle, being already boxed, will complete the circuit and the indication will be given to move the corresponding cam lever under its cam. From this it will be seen that when a depleted shuttle passes out of action and again becomes active, the circuit will be closed comparatively early, at some interval between rear and bottom centers.

As a special case suggesting a mode of operation wherein the early indication can be made use of, mention might be made of a pattern calling for two picks of one color followed by two picks of another color. Under these conditions the indicating shuttle will always pass out of action and the second of the conditions just described will always exist, so that in so-called two by two work more time is available for moving the selected shuttle in the magazine to the common transfer position.

*Magazine and shuttle advancers*

The magazine, designated generally at M is shown in Figs. 13 to 21 and comprises a bracket 100 having spaced bearing members 101 and 102, respectively, secured thereto, Fig. 13. Each bearing receives a stud 103 one of which has supporting relation with respect to the inner magazine plate 104 while the other has a similar relation to the outer plate 105.

The shuttles are arranged in two vertical stacks between said plates and are separated by a thin wall 106 supported on the outer plate 105 as shown in Fig. 17. A rear wall plate 107 is secured to the end plates and defines the rear guide for the rear stack of shuttles. Set screws hold the end plates and rear wall normally in fixed position and the central wall 106 is also normally fixed.

Fixed also to the magazine end plates is the front wall 108 in which is journaled a rocker shaft 109, see Fig. 15. A support 110 rocks around shaft 109 and has a yielding stop 111 to engage a shuttle moving downwardly from the front cell or forwardly from the rear cell, forming in effect a yielding front wall for the common transfer compartment. The stop is held normally in rear position by a spring 112 one end of which is attached to a collar 113 fixed to the shaft 109, while the other end of the spring is connected to that part of wall 108 in which shaft 109 rotates.

A second horizontal shaft 114 is journaled in the front wall 108 and has a shuttle support 115 provided with a shelf 116 to lie under the lowermost shuttle in the forward stack. This support is fixed to the shaft and may be moved in a right direction as viewed in Fig. 14 by means of an arm 117 secured to the shaft, 114. A spring 118 surrounding the shaft 114 tends to hold the parts in the position shown in Fig. 15.

A shuttle stack support 119 is supported by and moves angularly about shaft 114 against the action of a spring 120 one end of which is held by a collar 121 secured to the shaft 114 and the other end of which is in actuating relationship with respect to the stack support. The stack support 119 has a finger 122 which engages the shuttle support 115 so as to limit angular movement of the stack support in a right hand direction as viewed in Fig. 15 with respect to the shuttle support 115.

Under normal conditions spring 118 holds the shelf 116 under the front stack of shuttles SF and the resilient face 123, such as rubber, of the stack support will be held away from the next to the bottom shuttle in the front stack.

When lever 83 is depressed to exert a downward pull on wire 94 the latter acting through a flexible sheath 124 will lift the arm 117 against the action of spring 118, the effect of which is first to move the rubber pad 123 against the next to the bottom shuttle in stack SF, and then to move the supporting finger 116 from under the lowermost shuttle in said stack. The lowest shuttle, being thus without support, will fall to the support or plate 125. The latter is resiliently mounted for rearward motion on a pair of upwardly extending arms 126 and 127 which are pivoted on plates 104 and 105, respectively. A tension spring 128 interposed between the arm 127 and a fixed part of the magazine frame holds the box plate 125 yieldingly in the normal forward position shown in Fig. 14, a stop screw *a* in arm 127, Fig. 14, engages a part of the plate 105 to limit forward motion of said plate 125.

In order that the strain upon the rubber pad 123 of supporting the stack of bobbins in the front cell may be as short as possible the cam 91 is provided with a short dwell 129, being effective to release arm 117 as soon as the bottom shuttle has fallen to plate 125 and permit spring 118 to restore shelf 116 to its normal supporting position. This latter motion of the shelf takes place in sufficient time to catch the stack of shuttles which are released by the pad 123 when the latter moves to the left as viewed in Fig. 15 due to the rocking of the shaft 114 under action of spring 118. The parts moving with shaft 114 for the sake of convenience have been termed herein the shuttle advancer for the front stack of shuttles.

The weft delivery eyes of the shuttles of the front stack SF lie between the inner end of the front wall 108 and the selvage of the cloth, as shown in Fig. 17, the weft ends extending to a thread holder 130.

The rear stack of shuttles are supported normally by a back plate 131 fixed with respect to the magazine frame and extends between the plates 104 and 105. The rear shuttle advancer, shown in Figs. 15 and 18, has a back vertical wall 133 having on its opposite ends shuttle retaining yielding clips 134 and 135, respectively, with inbent ends 136. Wall 133 is mounted for sliding movement over the bottom plate 131 and is attached to a plunger 137 movable through a slide bearing 138 secured to the back of the magazine frame, as suggested in Figs. 14 and 18.

The plunger carries a driving pin 139 around which extends the slotted end 140 of lever 141 pivoted on a stud 142 adjustable as to position in a small slotted stand 143 secured to the magazine frame. Lever 141 has a stud 144 through which extends the upper end of rod 95. The latter has an adjustable nut 145 adapted to engage the top of the stud when the rod is depressed by lever 84 against the action of a tension spring 146 interposed between the top of said rod and a fixed part of the magazine.

As shown in Fig. 17, the central partition 106 is not connected at its inner or left end to the end plate 104, but is spaced therefrom to provide a passage for the threads extending from the rear stack of shuttles to the thread holder 130.

By the construction just described it will be seen that when rod 95 is depressed the plunger, and therefore the rear shuttle advancer, will move forwardly, and the parts are so proportioned that the lowest shuttle of the rear stack or group SR will be moved into the space above the movable plate 125 and behind the yielding stop 111. During this movement the upper shuttles of the stack SR are supported by a part of the back wall 133, and as said plunger moves back to its rear position the shuttles fall to be supported by the rear plate 131.

*Shuttle transferring mechanism*

After a shuttle drawn from either stack has reached the common transfer compartment over plate 125, it is necessary to provide some means to place it in action, and this I accomplish by mechanism more particularly in Figs. 1, 7, 8, 10, 11, and this mechanism may be controlled either mechanically or electrically.

The mechanical control for the box lifting mechanism operates simultaneously with the advancers and includes a lever 150 pivoted as at 151 to a fixed part of the loom structure and having an arm at the upper part thereof with a horizontally extending finger 152. The latter lies under both of the levers 83 and 84 so that depression of either of them will rock lever 150 in a counter-clockwise direction as viewed in Fig. 7. A yielding connection 153 is interposed between the lever 150 and a second lever 154 pivoted as at 155 to a fixed part of the loom frame. When the latter lever rocks under influence of lever 150 it exerts a pull on a connector 156 attached to a key 157 pivoted as at 158 to a periodically moving lever 159, and moves said key to lifting position.

In the second or electrical device for controlling the key 157 there is provided a third solenoid 200 having a core 201 operatively connected to the key. This solenoid is placed in the grounded part of the two previously described circuits to be common to both, so that when current flows through either solenoid 71 or 72 current will also flow through solenoid 200. Wire 202 leads from the transformer T to solenoid 200, while wire 203 grounds said solenoid. The relation of these parts is diagrammatically shown in Fig. 27. This electrical control is quicker than that first described, and with its use the rising box B can start to move earlier than when the mechanical arrangement is used.

The remainder of the mechanism to be described, namely, that set into motion when the key moves to lifting position, and shown more particularly in Fig. 8, is substantially the same as that shown in Chevrette Patent No. 1,834,302. A brief description of this mechanism is given herein in order to complete an understanding of the manner in which a shuttle is placed in action.

Lever 159 cooperates with a regularly moving cam 160 and is moved by the latter about a fixed pivot 161 so that the key is given an upward movement at that time in the cycle of the loom when a shift of shuttles is to be made from the magazine to the lay. A normally stationary lever 162 also mounted on the stud 161 is operatively connected to mechanism indicated at the left of Fig. 7 designated generally herein at 163 and having an upwardly extending rod 164 the top of which is connected to a rising transfer box 165. The latter has a pivoted cover 166, see Fig. 16, having a stud 167 to engage a stationary cam 168 carried by the magazine. The box cover pivots about an axis 169 moving with the rising box and the mechanism is such that as the box rises and moves rearwardly with the lay the stud 167 will engage the cam 168 to lift the cover positively against the action of a torsion spring 170 effective normally to hold the box cover in down position.

Inner and outer lugs 171 and 172, respectively, are carried by the rising box R, and when raised engage adjustable screws 173 on the swinging frame which carries the movable plate 125. The latter will therefore move rearwardly as the lay nears the limit of its rearward motion to release the shuttle thereon. The shuttle will thereupon fall into the rising box, being prevented from moving rearwardly by wall 174 fixed to the lay and being held against improper forward movement by forwardly bent fingers 175, Figs. 13 and 16, projecting upwardly from a binder 176 pivoted to the lay but held against vertical movement relatively thereto.

As the lay starts its forward motion the lug 167 will roll down cam 168 and the cover 166 will be lowered by action of gravity and the spring 170 to push the new shuttle down on the box bottom 177. When cam 160 finally restores the box to normal low position the box bottom will be opposite the race plate 178 of the lay ready for picking.

It is to be understood that the exhausted shuttle arrives under the magazine when the boxes are up and enters the auxiliary lower box 179. This box is made without retaining walls to hold a shuttle, and on a forward beat of the lay after the shuttle arrives in the auxiliary box and after the latter moves down to normal position, the shuttle will be expelled from the auxiliary box onto inclined guides 180 and to the shuttle holder 181, this being caused by the momentum of the lay and the sudden change in the direction in which the latter moves. It is also to be understood that when the boxes are up and the exhausted shuttle is received in the auxiliary box that the binder 176 which is held from vertical movement checks the flight of the shuttle coming into the auxiliary box, but on a downward movement of the boxes the auxiliary box moves away from the stationary binder 176 and the shuttle in the auxiliary box is free to move from the lay. A more complete description of this feature may be had by referring to Patent No. 1,753,233 of April 8, 1930, to Chevrette, and also No. 1,554,374 of September 22, 1925, to Ryon.

From the foregoing it will be seen that there is provided a multicolor shuttle changing loom capable of running at high speeds and weaving light fabrics of fine yarns. The shuttles are threaded prior to changing and the outgoing exhausted shuttle carries its weft end forwardly from the path of the active shuttle. The pattern mechanism controls the operation of the shuttle advancers and avoids confusion of colors, as it also controls the shifting or drop boxes. The threads from each stack are provided with proper guides to prevent entanglement. Since the indication of weft exhaustion is given not later than the boxing of the active shuttle in the drop boxes, ample time is provided to place a shuttle from the proper group in transfer position and effect change without storing the indication.

Having thus described my invention it will be seen that changes and modifications may be made therein by those skilled in the art without departing from the spirit and scope of the invention and I do not wish to be limited to the details herein disclosed, but what I claim is:

1. In a multicolor shuttle changing loom, a magazine to supply two distinctive types of shuttles and having a discharge opening therein common to the different types of shuttles, a lay movable backwardly and forwardly in the loom, and means to effect transfer of a shuttle of either type derived from the magazine to the lay on the backward stroke thereof, the lay and opening in the magazine being in substantial vertical alignment when the means effects transfer of the shuttle.

2. In a multicolor shuttle changing loom, a magazine having a plurality of types of reserve shuttles, a lay movable backwardly and forwardly in the loom, an exhausted shuttle holder in front of the lay, means to effect transfer of any type of shuttle from the magazine to the lay when the latter is in rearward position, said lay effective to discharge the exhausted shuttle into the exhausted shuttle holder on the following forward beat of the lay.

3. In a multicolor shuttle changing loom, a lay moving back and forth between given rear and forward positions, a magazine to hold a plurality of substantially vertical stacks of shuttles having wefts of different types and having a discharge opening common to the different stacks of shuttles, said stacks being at different horizontal distances from the rear position of the lay, and means to transfer a shuttle derived from any of said stacks to the lay when the latter is in its rear position.

4. In a multicolor shuttle changing loom, a lay movable back and forth in the loom, a magazine having a plurality of groups of substantially similar reserve shuttles, the shuttles of each group having weft distinctive from that of any other group, means defining a normally empty compartment which is adjacent all of said groups and over the lay when the latter is in rear position, means to move a shuttle from any of said groups into said compartment, and mechanism additional to and independent of the last named means to transfer a shuttle from said compartment to said lay when the latter is in rear position.

5. In a multicolor shuttle changing loom, a lay movable back and forth in the loom, a magazine having a plurality of groups of reserve shuttles, the shuttles of each group having weft distinctive from that of any other group, means defining a normally empty compartment which is adjacent all of said groups, means effective to cause movement of a shuttle from any of said groups into said compartment, and mechanism additional to and independent of the last named means to transfer a shuttle from said compartment to said lay when the latter is in its rearmost position.

6. In a multicolor shuttle changing loom, a lay movable back and forth between rear and forward positions, a magazine having a plurality of groups of distinctive reserve shuttles, means defining a compartment adjacent each of said groups and capable of receiving a shuttle from any of said groups, said compartment being over the lay when the latter is in its rearmost position, and means to move a shuttle from the compartment to the lay when the latter is in rear position.

7. In a shuttle changing loom, a magazine having two substantially vertical compartments separated by a partition, said partition having an opening at its lower end, and weft controlled means to move a shuttle through said opening from one compartment to the other of said magazine upon indication of substantial weft exhaustion of a corresponding shuttle, the partition terminating above the path of movement of the shuttle which moves into said other compartment, the weft end extending from a shuttle moving to said other compartment passing under the partition.

8. In a multicolor shuttle changing loom having shifting shuttle boxes at one end thereof, a lay, a shuttle race on the lay, a magazine at the other end of the loom having substantially similar reserve shuttles having wefts of distinctive types arranged in groups according to weft, pattern mechanism, and means controlled by the pattern mechanism and operative during the pick prior to a shift of the shuttle boxes to select and thereafter transfer to the lay at the level of the shuttle race thereon a shuttle corresponding in type to the exhausted shuttle which is rendered active by said shift.

9. In a loom, a plurality of shifting shuttle boxes operating with a plurality of shuttles any one of which may become active, pattern mechanism to control the movements of the boxes and determine which shuttle shall be active, and mechanism controlled by the pattern mechanism and independent of the shifting boxes and effective within two picks of the loom to replace any exhausted active shuttle by another shuttle of the same kind.

10. In a loom, a plurality of shifting shuttle boxes operating with a plurality of shuttles any one of which may become active, pattern mechanism to control the movement of the boxes and determine which shuttle shall be active, a group of reserve shuttles for each of the shuttles which may become active, and means controlled by the pattern mechanism independent of the boxes and effective within two picks of the loom to replace any active shuttle which is exhausted by a shuttle drawn from the reserve group corresponding thereto.

11. In a loom, a plurality of shifting shuttle boxes operating with a plurality of shuttles any one of which may become active, pattern mechanism to control the movement of the boxes and determine which shuttle shall be active, a magazine having a plurality of groups of reserve shuttles, there being a group for each shuttle which may become active, and means controlled by the pattern mechanism independently of the boxes and effective within two picks after indication of exhaustion of any shuttle to move into action a reserve shuttle from the group corresponding to the active exhausted shuttle.

12. In a shuttle changing loom having drop boxes on one end to cooperate with a plurality of shuttles any one of which may become active and all of which are substantially the same except for the character of filling carried thereby, weft detecting mechanism for each of said shuttles, a magazine at the other end of the loom having groups of shuttles all of which are substantially the same except for the character of filling, said groups being arranged according to the filling, and means controlled by the weft detector of any drop box and effective within two picks of the loom to replace an exhausted shuttle corresponding to said drop box by a shuttle drawn from the corresponding stack in the magazine.

13. In a shuttle changing loom having drop boxes on one end to cooperate with a plurality of shuttles any one of which may become active and all of which are substantially the same except for the character of filling carried thereby, a plurality of substantially similar weft detectors, one for each drop shuttle box, a magazine having a plurality of groups of shuttles, one group for each shifting shuttle box, the shuttles in the magazine being substantially the same except for the weft carried thereby and said groups being arranged according to the wefts of the shuttles, and means controlled by the weft detector and effective within two picks of the loom to replace any active shuttle which is exhausted by a shuttle from a group the weft of which corresponds to the weft of the exhausted shuttle.

14. In a loom having drop boxes on one end to cooperate with a plurality of shuttles any one of which may become active and all of which are substantially the same except for the character of filling carried thereby, weft detecting mechanism adjacent the shifting shuttle boxes to cooperate with the active shuttle, a magazine having groups of reserve shuttles at the other end of the loom, said reserve shuttles being all substantially the same except for the filling they carry and the groups being arranged according to the filling, and means controlled by the weft detector and effective within two picks of the loom to replace an active exhausted shuttle by a reserve shuttle drawn from the group having filling corresponding to the exhausted shuttle when the exhausted shuttle reaches the magazine side of the loom.

15. In a shuttle changing loom having a plurality of shifting shuttle boxes operating with a set of shuttles any one of which may become active, said shuttles having distinctive weft, a weft detector to cooperate with any active shuttle while in the shifting boxes to determine the condition of weft therein, a pattern mechanism to control which of said shuttles shall be active, a plurality of groups of reserve shuttles, one group for each of the shuttles which may become active, the groups being arranged according to weft and the weft of each group corresponding to the weft of a shuttle which may become active, and means under the joint control of the detector and pattern mechanism and independent of the shifting boxes and effective within two picks of the loom to replace an active exhausted shuttle by a reserve shuttle from the group corresponding to the exhausted active shuttle.

16. In a shuttle changing drop box loom, a plurality of drop boxes at one side of the loom, a magazine having compartments adapted to receive shuttles having different kinds of weft, means to indicate substantial weft exhaustion in a shuttle in the actively positioned drop box, means to selectively release a corresponding shuttle from the magazine and to advance said shuttle to transfer position, and means to thereafter transfer said selected shuttle.

17. In a loom, shifting shuttle boxes at one end of the loom to cooperate with a plurality of shuttles any one of which may become active, pattern mechanism to determine the position of the shifting shuttle boxes, weft detecting mechanism to determine the condition of the weft in the active shuttle, a shuttle changing mechanism at that end of the loom opposite the shifting boxes, and means independent of the shifting shuttle boxes and under the joint control of the detecting mechanism and pattern mechanism and operative between successive movements of the latter to initiate and complete the removal of an exhausted active shuttle from active weaving position and move into active weaving position a shuttle carrying similar weft drawn from the shuttle changing mechanism.

18. In a multicolor shuttle changing loom, a plurality of groups of shuttles, the shuttles of each group having weft different from the weft of any other group, a thread holder common to the groups located between the latter and the center of the loom, and fixed means defining guideways for each of said groups of shuttles, said fixed means having provision for defining thread passages for the weft ends extending from the reserve shuttles to the thread holder.

19. In a multicolor shuttle changing loom, a pair of stacks of shuttles, the weft of each stack being different from that of the other stack, front and back walls, an intermediate wall to define with the said front and back walls front and back compartments respectively, said intermediate wall being spaced from the back wall throughout its height to define a thread passage for the weft ends extending from the reserve shuttles of the rear stack, said intermediate wall also being spaced from the front wall to define a passage for the weft ends of the front stack, and a thread holder between the stacks and the center of the loom to which the weft ends are attached, said passages being at that end of the walls adjacent the center of the loom.

20. In a shuttle changing loom, a pair of substantially vertical groups of reserve shuttles, means defining a transfer compartment adjacent both of said groups, said compartment being below the front group and in front of the lowermost shuttle of the rear group, the lowest shuttle of each group being movable into the compartment preparatory to transfer, a thread holder between the groups and the center of the loom, the threads from the shuttles of the rear group moving downwardly and the thread of the lowest shuttle of the rear group moving under the forward stack when moving into said transfer compartment.

21. In a shuttle changing loom, a pair of groups of reserve shuttles one located behind the other, a lay, a binder on the lay held against vertical movement relatively thereto, a shuttle box on the lay to rise with respect to the binder to a position under the front group of shuttles, upstanding horns on the binder, the lowermost shuttle of the rear group of shuttles being movable to a position under the lowest shuttle of the front group, the weft delivery eyes of the shuttles being between the horns on the binder and the cloth, and a thread holder between the center of the loom and the shuttle eyes, the lowest rear shuttle when moving under the front group maintaining its position between the horns on the binder and the thread holder to prevent entanglement of the weft ends extending therefrom with said horns.

22. In a multicolor shuttle changing loom, a magazine having reserve shuttles provided with different characters of weft, shifting shuttle boxes to cooperate with a plurality of shuttles any one of which may become active, weft detecting mechanism for the shuttles in the shifting shuttle boxes, control connections between the weft detecting mechanism and the magazine, means to render said connections effective prior to the shifting of shuttle boxes on any given pick to actuate the magazine to release a reserve shuttle having weft corresponding to that carried by the shuttle to be active on the next pick, and means to move the reserve shuttle to active picking position on the pick of the loom next following said given pick.

23. In a multicolor shuttle changing loom, a plurality of shifting shuttle boxes, a reserve shuttle magazine, means to indicate weft exhaustion in any shuttle in the shifting boxes prior to a shifting thereof, and mechanism controlled by said means to replace the exhausted shuttle by a shuttle from the magazine during the pick following the shift of shuttle boxes.

24. In a multicolor shuttle changing loom, a pattern mechanism, a set of shifting shuttle boxes on one side of the loom operating with a plurality of substantially similar shuttles any one of which may become actively placed for picking at a given point in the loom cycle under control of the pattern mechanism and remain active for a period the length of which is independent of the length of the period during which any other shuttle is active, a stationary shuttle magazine on the other side of the loom having a plurality of groups of shuttles all of which are substantially similar, each group having weft of a character different from that of any other group, the shifting boxes holding an idle shuttle out of action while the active shuttle is running, an electric circuit carried in part by the shifting boxes, said circuit to be closed at a time in the cycle of the loom not later than the boxing of an active exhausted shuttle on the shifting shuttle box side of the loom, and means under control of the pattern mechanism and acting at a time prior to said given point to control the closing of the circuit to replace any exhausted active shuttle upon arrival at the magazine side of the loom by a shuttle from the magazine having a weft corresponding to the pattern.

25. In a multicolor shuttle changing loom, shifting shuttle boxes operating with a plurality of shuttles any one of which may become active, exhaustion indicating mechanism to indicate exhaustion in any shuttle, a multicolor reserve shuttle magazine having shuttles of different types, a color selector mechanism for the magazine to determine which type of shuttle shall be transferred, and means to cause register between the color mechanism and the shuttle boxes prior to the completion of a shifting movement of the latter when the exhaustion indicating mechanism indicates exhaustion in the active shuttle, to the end that the indicating shuttle will be replaced by a similar shuttle at the magazine.

26. In a multicolor shuttle changing loom, shifting shuttle boxes operating with a plurality of shuttles any one of which may become active, a multicolor magazine having groups of shuttles of various wefts corresponding to the shuttles in the drop boxes, means to indicate exhaustion of weft in the shuttle next to be active prior to the completion of the shifting of the shuttle boxes which places the exhausted shuttle in active position, the groups of shuttles in the magazine being normally at rest, means under control of the exhaustion indicating mechanism effective to assist movement of a reserve shuttle from any group in a transferring movement, the magazine having an unobstructed passageway for each group, and the shuttle of each group passing through the corresponding passageway in transfer movement, whereby two successive transfers of reserve shuttles from the same group may occur.

27. In a multicolor shuttle changing loom, a lay, shifting shuttle boxes operating with a plurality of shuttles any one of which may become active, a multicolor magazine capable of supplying shuttles of various wefts corresponding to the shuttles in the drop boxes, means to indicate exhaustion of weft prior to the time of picking the exhausted shuttle from the shifting boxes, means on the backward stroke of the lay following the picking to move a shuttle similar to the exhausted shuttle from the magazine to the lay, and means when the lay next reaches the picking position to pick the fresh shuttle toward the shifting shuttle boxes.

28. In a multicolor shuttle changing loom, a lay, shifting shuttle boxes operating with a plurality of shuttles any one of which may become active, a multicolor magazine capable of supplying shuttles of various wefts corresponding to the shuttles in the drop boxes, means to indicate exhaustion in a shuttle when the lay is in its forward position, means during the following backward movement of the law to pick the shuttle, other means operative during said backward movement of the lay to select a shuttle from the magazine similar to the picked exhausted shuttle, means operative when the lay reaches its rearward position to move the selected fresh shuttle to the lay, and means during the next backward movement of the lay to pick the fresh shuttle to the shifting shuttle boxes.

29. In a multicolor shuttle changing loom, shifting shuttle boxes operating with a plurality of shuttles any one of which may become active, a multicolor magazine capable of supplying shuttles of various wefts corresponding to the shuttles in the shifting boxes, means to initiate the selection of a shuttle similar to an active exhausted shuttle from the magazine prior to the completion of the box shift which renders the exhausted shuttle active, means effective to move the selected shuttle to the lay when the latter is in one extreme of its back and forth movement, and means on the lay to engage the shuttle at the beginning of the movement of the lay away from said extreme position to positively move the shuttle with the lay.

30. In a multicolor shuttle changing loom, a lay having shuttle holding means at one end of the lay, stationary means to hold a plurality of groups of reserve shuttles, each group of reserve shuttles having distinctive weft, selective means to determine from which group a reserve shuttle is to be drawn, means to effect discharge of a depleted shuttle from said shuttle holding means forwardly with respect to the lay, and means to insert into said shuttle holding means a fresh shuttle drawn from a selected group of reserve shuttles.

31. In a multicolor shuttle changing loom, a lay, stationary means to hold a plurality of groups of reserve shuttles, each group having distinctive weft, shuttle holding means located on one end of the lay to receive a spent shuttle from the opposite end of the lay, selective means to determine from which group a reserve shuttle is to be drawn for said holding means, said holding means retaining the depleted shuttle therein until the lay reaches forward position and thereby preserving the tension of the last pick laid by said shuttle, said depleted shuttle being discharged from said holding means after said depleted shuttle reaches forward position, and means to insert into said holding means a fresh shuttle drawn from the selected group of reserve shuttles.

32. In a multicolor shuttle changing loom, a lay movable forwardly to beat a pick of filling into the cloth, stationary means to hold a plurality of groups of reserve shuttles, each group having distinct weft, selective means to determine from which group a reserve shuttle is to be drawn at the time of shuttle change, shuttle-holding means on one end of the lay effective to receive a shuttle drawn from the selected group and also to receive the depleted shuttle from the opposite end of the lay, said holding means retaining the depleted shuttle in its normal position longitudinally of the lay until the latter has reached its forward position, and said depleted shuttle being then discharged forwardly, whereby the tension of the last weft laid by the depleted shuttle is preserved until said weft is incorporated in the cloth being woven.

33. In a multicolor shuttle changing loom, a lay movable forwardly to beat a pick of filling into the cloth, stationary means to hold a plurality of groups of reserve shuttles, each group having distinct weft, selective means to determine from which group a reserve shuttle is to be drawn at the time of shuttle change, shuttle box mechanism on that end of the lay adjacent said groups and effective to receive a shuttle drawn from any group and to move such shuttle to active picking position, said shuttle box mechanism also receiving the depleted shuttle from the opposite side of the lay on the shuttle changing beat of the loom and holding said depleted shuttle during the ensuing forward movement of the lay and while the lay beats up the filling extending from said depleted shuttle, and said depleted shuttle being discharged forwardly from said shuttle box mechanism at the end of said forward movement of the lay.

34. In a multi-color shuttle changing loom, a magazine having a plurality of compartments each adapted to supply a distinct type of shuttle and having a common point of delivery for all of said shuttles, means to select and advance a shuttle to said delivery point, support means to hold the advanced shuttle at said common point of delivery, and means to remove said support means to release the selected shuttle by rearward movement of the lay, said shuttle being thereafter transferred by gravity to said lay.

35. In a multi-shuttle shuttle changing loom, shifting shuttle drop boxes on one side of the loom, pattern mechanism, means controlled by the pattern mechanism to shift said boxes, a stationary magazine on the other side of the loom having a plurality of stacks of reserve shuttles corresponding by type of weft to the weaving shuttles in the drop boxes, means to transfer a shuttle from any said stack to the lay, a shiftable weft selector the position of which determines which stack of shuttles will be acted upon when said transfer means is actuated, means controlled from the pattern mechanism to shift the position of said selector in the interval between the motion of the pattern mechanism to give an indication of drop box shift and the next picking from the drop boxes, whereby said selector is always in register with the shuttle next to be picked from the drop boxes before said shuttle is picked therefrom, detector mechanism to detect weft exhaustion in the weaving shuttles, means to actuate said transfer means, said actuating and transfer means being normally disconnected, means actuated by said detector to operatively couple said transfer means with said actuating means in the interval between reception of an active shuttle in the shifting boxes and the next pick therefrom, provided the shuttle next to be picked is substantially exhausted of weft for actuation of said transfer means, as controlled by said selector, to transfer from the magazine to the lay a reserve shuttle corresponding by type of weft to said exhausted shuttle prior to the next pick after the picking of said exhausted shuttle from the shuttle drop boxes.

36. In a multi-shuttle shuttle changing loom, shifting shuttle drop boxes on one side of the loom, pattern mechanism, means controlled by the pattern mechanism to shift said drop boxes, a stationary magazine on the other side of the loom having a plurality of stacks of reserve shuttles corresponding by type of weft to the weaving shuttles in the drop boxes, a common point of delivery for the bottom shuttle of each stack, means for positioning at said delivery point the bottom shuttle of any of said stacks, a shiftable weft selector the position of which determines which stack of shuttles will be acted upon when said positioning means is actuated, means to shift the position of said selector in the interval between the motion of the pattern mechanism to give an indication of drop box shift and the next picking from the drop boxes, whereby said selector is always in register with the shuttle next to be picked from the drop boxes before said shuttle is picked therefrom, detector mechanism to detect weft exhaustion in the weaving shuttles, means to actuate said positioning means, said actuating and positioning means being normally disconnected, means actuated by said detector to operatively couple said positioning means with said actuating means in the interval between reception of an active shuttle in the shifting boxes and the next pick therefrom, provided the shuttle next to be picked is exhausted, for actuation of said positioning means as controlled by said selector, to deliver to said common delivery point, prior to the second pick following said interval, a reserve shuttle corresponding by type of weft to said exhausted shuttle, and means to transfer said shuttle from said delivery point to the lay prior to the next pick after positioning of said shuttle at said delivery point.

37. In a multi-shuttle shuttle changing loom, shifting shuttle drop boxes on one side of the loom, pattern mechanism, means controlled by the pattern mechanism to shift said boxes, a stationary magazine on the other side of the loom having a plurality of stacks of reserve shuttles corresponding by type of weft to the weaving shuttles in the drop boxes, means to transfer a shuttle from any said stack to the lay, a shiftable weft selector the position of which determines which stack of shuttles will be acted upon when said transfer means is actuated, means controlled from the pattern mechanism to shift the position of said selector in the interval between the motion of the pattern mechanism to give an indication of drop box shift and the next picking from the drop boxes, whereby said selector is always in register with the shuttle next to be picked from the drop boxes before said shuttle is picked therefrom, weft exhaustion detector mechanism associated with each drop box comprising normally disconnected electric contacts of an electric circuit, means whereby said contacts will be connected for current transmission through a substantially exhausted shuttle in the boxes, means to actuate said transfer means, said actuating and transfer means being normally disconnected, means actuated by said detector circuit to operatively couple said transfer means with said actuating means in the interval between reception of an active shuttle in the shifting boxes and the next pick therefrom, provided the shuttle next to be picked is exhausted, for actuation of said transfer means as controlled by said selector, to transfer from the magazine to the lay a reserve shuttle corresponding by type of weft to said exhausted shuttle prior to the next pick after the picking of said exhausted shuttle from the shuttle drop boxes.

38. In a multi-shuttle shuttle changing loom, shifting shuttle drop boxes on one side of the loom, pattern mechanism, means controlled by the pattern mechanism to shift said drop boxes, a stationary magazine on the other side of the loom having a plurality of stacks of reserve shuttles corresponding by type of weft to the weaving shuttles in the drop boxes, a common point of delivery for the bottom shuttle of each stack, means for positioning at said delivery point the bottom shuttle of any of said stacks, a shiftable weft selector the position of which determines which stack of shuttles will be acted upon when said positioning means is actuated, means to shift the position of said selector in the interval between the motion of the pattern mechanism to give an indication of drop box shift and the next picking from the drop boxes, whereby said selector is always in register with the shuttle next to be picked from the drop boxes before said shuttle is picked therefrom, weft exhaustion detector mechanism associated with each drop box comprising normally disconnected electric contacts of an electric circuit, means whereby said contacts will be connected for current transmission through a substantially exhausted shuttle in the boxes, means to actuate said positioning means, said actuating and positioning means being normally disconnected, means actuated by said detector circuit to operatively couple said positioning means with said actuating means in the interval between reception of an active shuttle in the shifting boxes and the next pick therefrom, provided the shuttle next to be picked is exhausted, for actuation of said positioning means as controlled by said selector, to deliver to said common delivery point, prior to the second pick following said interval, a reserve shuttle corresponding by type of weft to said exhausted shuttle, and means to transfer said shuttle from said delivery point to the lay prior to the next pick after positioning said shuttle at said delivery point.

39. In a multi-shuttle shuttle changing loom, shifting shuttle drop boxes on one side of the loom, pattern mechanism, means controlled by the pattern mechanism to shift said drop boxes, a stationary magazine on the other side of the loom having a plurality of stacks of reserve shuttles corresponding by type of weft to the weaving shuttles in the drop boxes, a common point of delivery for the bottom shuttle of each stack, means for positioning at said delivery point the bottom shuttle of any of said stacks, a shiftable weft selector the position of which determines which stack of shuttles will be acted upon when said positioning means is actuated, means controlled from the pattern mechanism to shift the position of said selector in the interval between the motion of the pattern mechanism to give an indication of drop box shift and the next picking from the drop boxes, whereby said selector is always in register with the shuttle next to be picked from the drop boxes before said shuttle is picked therefrom, detector mechanism to detect weft exhaustion in the weaving shuttles, means to actuate said positioning means, said actuating and positioning means being normally disconnected, means actuated by said detector to operatively couple said positioning means with said actuating means in the interval between reception of an active shuttle in the shifting boxes and the next pick therefrom, provided the shuttle next to be picked is exhausted, for actuation of said positioning means, as controlled by said selector, to deliver to said common delivery point, prior to the second pick following said interval, a reserve shuttle corresponding by type of weft to said exhausted shuttle, a shifting change box on the magazine side of the loom having fresh shuttle and exhausted shuttle receiving compartments, means to transfer a fresh shuttle from said delivery point to a fresh shuttle receiving compartment of the change box, means to shift said change box substantially concurrently with actuation of said positioning means to receive a fresh shuttle from said transfer means in said fresh shuttle receiving compartment and the said exhausted shuttle from the lay race in an exhausted shuttle receiving compartment, and thereafter to again shift said change box to transfer said fresh shuttle to picking position prior to the next pick following the pick of the exhausted shuttle from the drop box.

40. In a multi-shuttle shuttle changing loom, shifting shuttle drop boxes on one side of the loom, pattern mechanism, means controlled by the pattern mechanism to shift said drop boxes, a stationary magazine on the other side of the loom having a plurality of stacks of reserve shuttles corresponding by type of weft to the weaving shuttles in the drop boxes, a common point of delivery for the bottom shuttle of each stack, means for positioning at said delivery point the bottom shuttle of any of said stacks, a shiftable weft selector the position of which determines which stack of shuttles will be acted upon when said positioning means is actuated, means to shift the position of said selector in the interval between the motion of the pattern mechanism to give an indication of drop box shift and the next picking from the drop boxes, whereby said selector is always in register with the shuttle next to be picked from the drop boxes before said shuttle is picked therefrom, weft exhaustion detector mechanism associated with each drop box comprising normally disconnected electric contacts in an electric circuit, means whereby said contacts will be connected for current transmission by a substantially exhausted shuttle in the boxes, means to actuate said positioning means, said actuating and positioning means being normally disconnected, means actuated by said detector circuit to operatively couple said positioning means with said actuating means in the interval between reception of an active shuttle in the shifting boxes and the next pick therefrom, provided the shuttle next to be picked is exhausted, for actuation of said positioning means as controlled by said selector, to deliver to said common delivery point, prior to the second pick following said interval, a reserve shuttle corresponding by type of weft to said exhausted shuttle, a shifting change box on the magazine side of the loom having fresh shuttle and exhausted shuttle receiving compartments, means to transfer a fresh shuttle from said delivery point to a fresh shuttle receiving compartment of the change box and means to shift said change box substantially concurrently with actuation of said positioning means to receive a fresh shuttle from said transfer means in a fresh shuttle receiving compartment and the exhausted shuttle from the lay race in an exhausted shuttle receiving compartment, and thereafter to again shift said change box to transfer said fresh shuttle to picking position prior to the next pick following pick of the exhausted shuttle from the drop box.

41. In a multi-shuttle shuttle changing loom, shifting shuttle drop boxes on one side of the loom, one box for each type of weft being used, weft exhaustion detector mechanism associated with each drop box comprising normally disconnected electric contacts, means whereby said contacts will be connected for current transmission by a substantially exhausted shuttle in the box at a time in the loom cycle substantially in advance of the point in the cycle when the shuttle is picked from the shifting shuttle boxes, and an electric detector circuit connectable to said contacts, a stationary magazine on the other side of the loom having a plurality of stacks of reserve shuttles corresponding by type of weft to the weaving shuttles in the drop boxes, means to transfer a shuttle from any said stack to the lay, pattern mechanism having a plurality of separate surfaces which assume different positions, means controlled by movement of said separate surfaces to a given position to shift the drop boxes, means initiated from said pattern control movement to said given position to connect a detector circuit to the contacts of the drop box of the next active shuttle in the interval when each drop box contains a shuttle and to disconnect all circuits to the contacts of the other boxes throughout said interval, and means to register the shuttle transfer means by the circuit through the detector contacts for said next active drop shuttle box, if said shuttle therein is exhausted, for actuation of said transfer means to transfer from the magazine to the lay a shuttle corresponding by type of weft to said exhausted shuttle prior to the next pick after the picking of said exhausted shuttle from the drop shuttle boxes.

42. In a multi-shuttle shuttle changing loom, shifting shuttle boxes on one side of the loom operating with a plurality of weaving shuttles any one of which may become active, each weaving shuttle to remain active at least two successive picks, weft detector means to determine the condition of weft in any weaving shuttle, pattern mechanism to determine which of the weaving shuttles shall become active, a stationary magazine on the other side of the loom having groups of reserve shuttles corresponding by type of weft to the weaving shuttles, means to deliver a reserve shuttle from any group on the magazine, means to transfer a said delivered shuttle to the lay, means to actuate said delivering means, said delivering and actuating means being normally disconnected, shiftable means for operatively connecting said shuttle delivering means with said actuating means selectively for delivery from different groups of shuttles in said magazine, means controlled jointly by the detector means and pattern mechanism to operatively and selectively position said connecting means in the interval between reception of an active shuttle in the shifting boxes and the next pick therefrom, provided the shuttle next to be picked is exhausted. for actuation of said delivering means, to deliver from the magazine prior to the second pick following said interval a shuttle corresponding by type of weft to said exhausted shuttle, and means to actuate said transfer means to transfer said delivered shuttle to the lay prior to said pick.

43. In a multi-shuttle shuttle changing loom, shifting shuttle boxes on one side of the loom operating with a plurality of weaving shuttles any one of which may become active, each weaving shuttle to remain active at least two successive picks, weft detective means to determine the condition of weft in any weaving shuttle, pattern mechanism to determine which of the weaving shuttles shall become active, a stationary magazine on the other side of the loom having groups of reserve shuttles corresponding by type of weft to the weaving shuttles. means to deliver a shuttle from any group in the magazine, means to actuate said delivering means, said delivering and actuating means normally disconnected, shiftable means for operatively connecting said shuttle delivering means with said actuating means selectively for delivery from different groups of shuttles in said magazine, means controlled jointly by the detector means and pattern mechanism to operatively and selectively position said connecting means in the interval between reception of an active shuttle in the shifting boxes and the next pick therefrom, provided the shuttle next to be picked is exhausted, for actuation of said delivering means to deliver from the magazine prior to the second pick following said interval a shuttle corresponding by type of weft to said exhausted shuttle, a shifting change box on the magazine side of the loom having fresh shuttle and exhausted shuttle receiving compartments, and means to shift said change box substantially concurrently with actuation of said delivering means to receive a fresh shuttle from said delivering means in a fresh shuttle receiving compartment and the exhausted shuttle in an exhausted shuttle receiving compartment, and thereafter to again shift said change box to transfer said fresh shuttle to picking position prior to the next pick after pick of said exhausted shuttle from the drop boxes.

44. In a multi-shuttle shuttle changing loom, a lay, a plurality of shifting shuttle boxes on the lay to render active for at least two successive picks any one of a plurality of weaving shuttles, a stationary magazine having groups of reserve shuttles, one group for each weaving shuttle, pattern mechanism having a surface to control movements of the shifting boxes, weft detector means to determine the condition of weft in the weaving shuttle next to be picked from the shifting shuttle boxes, means controlled jointly by the weft detector means and said surface of the pattern mechanism to select and deliver a shuttle from the magazine to the lay within an interval of two successive beats of the loom from indication of weft exhaustion by the weft detector means, change box mechanism on the lay at the magazine end of the loom having a cycle of movements which is completed within said two successive beats of the loom, means under the joint control of the weft detector and said surface of the pattern mechanism to select and deliver from the magazine to the change box mechanism a reserve shuttle from the group corresponding to the exhausted weaving shuttle, and means controlled by the detector mechanism to give the change box mechanism its cycle of movements, said change box mechanism during its cycle moving a delivered reserve shuttle on the lay to active weaving position preparatory to picking thereof, whereby shuttle changing operations of the loom may occur on alternate beats of the loom.

45. In a multi-shuttle shuttle changing loom having a lay, a plurality of shifting shuttle boxes on the lay operating with a plurality of weaving shuttles and shifting during a part of the loom cycle prior to picking to move any selected weaving shuttle to active position, each weaving shuttle to remain active for at least two successive picks, pattern mechanism having a plurality of separate surfaces movable progressively to a given position to control the movement of the shuttle boxes and determine which shuttle shall be active, groups of reserve shuttles separate from the lay, one group for each of the weaving shuttles which may become active, and means controlled by the separate pattern surface in said given position and independent of the shuttle boxes and including two concurrently acting mechanisms effective within a period of two successive picks of the loom to replace any exhausted active shuttle by a shuttle drawn from the reserve group corresponding thereto, one mechanism to initiate selection and delivery to the lay prior to completion of a shift of the shuttle boxes of a shuttle drawn from the said reserve group, and the other mechanism effective to place the selected reserve shuttle in active picking position on the lay, the mechanisms of said means being controlled by the pattern surface in said given position to the end that shuttle changing operations of the loom can occur on alternate beats of the loom.

46. In a multi-shuttle loom having a lay, a plurality of shifting shuttle boxes on the lay operating with a plurality of weaving shuttles and shifting during a part of the loom cycle prior to picking to move any selected weaving shuttle to active position, each weaving shuttle to remain active at least two successive picks, pattern mechanism having a plurality of separate surfaces movable progressively to a given position to control the movements of the shifting shuttle boxes and determine which weaving shuttle shall be acted upon, a stationary magazine having groups of reserve shuttles corresponding to the weaving shuttles, means controlled by the separate surface of the pattern mechanism in said given position and operative at a time prior to the completion of a shift of the shuttle boxes to select and deliver a reserve shuttle from the magazine to the lay within an interval of two successive beats of the loom, and other means controlled by the condition of weft in a weaving shuttle and also by the separate pattern surface in said given position to move the selected reserve shuttle into active weaving position on the lay preparatory to picking thereof within the same interval of two successive beats of the loom, to the end that shuttle changing operations of the loom can occur on alternate beats of the loom irrespective of movement of said separate surfaces relatively to said given position.

47. In a multi-shuttle shuttle changing loom having a lay, shifting shuttle boxes on the lay at one side of the loom operating with a plurality of weaving shuttles any one of which may become active, each weaving shuttle to remain active at least two successive picks and capable of remaining active for an even number of picks larger than two, a weft detector on the shifting shuttle box side of the loom to indicate weft exhaustion at a point in the loom cycle substantially in advance of the time of picking a weaving shuttle from the shifting shuttle boxes, pattern mechanism having a plurality of separate surfaces movable to a given position to determine which of the weaving shuttles shall become active, a stationary magazine having groups of reserve shuttles corresponding to the weaving shuttles, and means controlled by indications received jointly from the weft detector and the separate pattern surface in said given position and effective within an interval of two successive beats of the loom to replace any active depleted weaving shuttle by a shuttle drawn from the reserve group corresponding thereto, said last named means including two concurrently acting mechanisms both controlled from a separate pattern surface in said given position and one of which selects and delivers from the magazine to the lay a shuttle to replace the active depleted weaving shuttle and the other of which moves the selected reserve shuttle on the lay to active weaving position preparatory to picking thereof, to the end that shuttle changing operations of the loom can occur on alternate beats thereof.

48. In a multi-shuttle shuttle changing loom, a lay, shifting shuttle boxes on the lay operating with a plurality of weaving shuttles any one of which may become active, means to shift the shuttle boxes during a given interval in a cycle of two successive beats of the loom, each weaving shuttle to remain active at least two successive picks, a stationary magazine having groups of reserve shuttles of various wefts corresponding to the weaving shuttles, pattern mechanism having a plurality of separate surfaces movable to a given point to determine the movements of the shifting shuttle boxes, means controlled from a pattern surface in said given position to indicate weft exhaustion in the weaving shuttle next to be picked from the shifting shuttle boxes at a time in said cycle of two beats of the loom prior to the completion of a shift of the shuttle boxes, means under joint control of the weft exhaustion indicating means and a separate pattern surface in said given position to select and deliver from the magazine to the lay a reserve shuttle corresponding to the depleted weaving shuttle within said cycle of two successive beats of the loom, and other means also under control of exhaustion indicating means to move the selected shuttle on the lay to active weaving position preparatory to picking thereof within said cycle of two beats of the loom, to the end that transfers of reserve shuttles may occur at two-beat intervals of the loom.

49. In a loom having a reciprocating lay and a plurality of shifting shuttle boxes at one end thereof cooperating with a plurality of weaving shuttles, the shuttle boxes shifting relatively to the lay during an interval starting substantially with the normal time of arrival of an active weaving shuttle at the shifting shuttle box end of the lay and ending when the lay reaches picking position in the following rearward stroke thereof to place any selected shuttle box and weaving shuttle therein in picking position and place the remainder of the shuttle boxes and weaving shuttles out of action, a weft detector on that side of the loom where said remainder of the shuttle boxes are out of action to indicate weft exhaustion in the shuttle in the shuttle box next to be active prior to the end of said interval, pattern mechanism acting prior to said interval to determine which of the shuttle boxes shall be in active position at the end of said interval, and shuttle changing mechanism under the joint control of the detector and pattern mechanism and effective within a period of two successive complete reciprocations of the lay starting with the indication of weft exhaustion by the detector to replace an exhausted active shuttle by another shuttle having the same type of filling as that of the exhausted shuttle placed in active position on the lay.

50. In a loom having a reciprocating lay and operating with a plurality of weaving shuttles and shifting shuttle boxes therefor at one end of the lay which shift relatively to the lay during an interval starting substantially with the normal time of arrival of an active weaving shuttle at the shifting shuttle box end of the lay and ending when the lay reaches picking position in the following rearward stroke thereof to place any selected shuttle box and weaving shuttle therein in active position and place the remainder of the shuttle boxes and shuttles therein inactive position, weft detecting mechanism on one side of the loom to cooperate with the active shuttle, a shuttle magazine at the other side of the loom having groups of reserve shuttles, the groups being arranged according to wefts and there being one group for each of the weaving shuttles which may become active, said shuttles all being substantially the same except as to the weft they carry, said detecting mechanism effective to indicate exhaustion of weft in any shuttle about to become active when the latter is on the detecting side of the loom prior to the end of said interval, and means initiated by the detecting mechanism prior to the end of said interval and operative during the next complete reciprocation of the lay starting with the end of said interval to replace the exhausted shuttle by a reserve shuttle drawn from the group corresponding thereto and placed in active position on the lay.

51. In a multicolor shuttle changing loom having a reciprocating lay, shifting shuttle boxes operating each with a weaving shuttle and shifting during an interval starting substantially with the normal time of arrival of an active weaving shuttle at the shifting shuttle boxes and ending when the lay next reaches position for picking to place any one of the shuttle boxes in active position at the end of said interval, means to indicate weft exhaustion in the shuttle of the shuttle box to be active at the end of a given interval prior to the end of said interval, a magazine having different types of reserve shuttles corresponding to the weaving shuttles, and mechanism controlled by the means to indicate weft exhaustion and operating during a period of loom operation starting prior to the end of said interval and effective during the one complete reciprocation of the lay following indication of weft exhaustion and beginning at the end of said interval to replace the exhausted shuttle by a similar shuttle drawn from the magazine and placed in active position on the lay.

52. In a multicolor shuttle changing loom having a reciprocating lay at one end of which are shifting shuttle boxes operating with a plurality of weaving shuttles and shifting with respect to the lay during an interval starting substantially with the normal time of arrival of an active weaving shuttle at the shifting shuttle box end of the loom and ending when the lay reaches picking position in the following rearward stroke thereof to place any one of the shuttle boxes in active position at the end of the interval, two complete successive reciprocations of the lay starting with the beginning of an aforesaid interval constituting a cycle of loom operations, a multicolor magazine capable of supplying reserve shuttles of various wefts corresponding to the weaving shuttles, the active shuttle when at the shifting shuttle box end of the lay being picked immediately after the said interval, weft exhaustion indicating mechanism acting prior to the end of a box shifting interval of a given cycle to indicate exhaustion of weft in the shuttle next to be picked from the shifting shuttle boxes at the end of said interval, and means set into motion by the exhaustion indicating mechanism prior to the end of said interval of the given cycle and effective before the end of the box shifting interval of the next cycle is reached to move a shuttle similar to the exhausted shuttle from the magazine to active position on the lay.

53. In a multicolor shuttle changing loom having a reciprocating lay movable to picking position once for each complete reciprocation thereof, shifting shuttle boxes operating with a plurality of weaving shuttles and shifting relatively to the lay during an interval starting substantially with the normal time of arrival of an active weaving shuttle at the shifting shuttle box end of the lay and ending when the lay next reaches picking position to place any selected shuttle box and weaving shuttle therein in active position, two complete successive reciprocations of the lay starting with the beginning of an interval and during which the lay is in picking position twice constituting a loom cycle, a multicolor magazine capable of supplying reserve shuttles of various wefts corresponding to the shuttles in the shifting shuttle boxes, means to indicate exhaustion of weft in the active shuttle at a time substantially in advance of the ending of a box shifting interval of a given cycle which places the active shuttle in picking position, means controlled by the exhaustion indicating means effective during that part of said given cycle following arrival of the lay in picking position for the first time in said cycle and after the exhausted shuttle has been picked away from the shifting boxes to move a shuttle similar to the exhausted shuttle from the magazine to active position on the lay, and means when the lay next reaches picking position in said given cycle to pick the fresh shuttle toward the shifting shuttle boxes.

54. In a multi-shuttle shuttle changing loom having a reciprocating lay, shuttle boxes on one side of the loom cooperating with a plurality of weaving shuttles shiftable during a regularly recurring interval starting substantially with the normal time of arrival of the active shuttle at said one side of the loom and ending when the lay is substantially in picking position during the following rearward stroke thereof to move any one of the shuttles to active position, a stationary magazine on the other side of the loom having a plurality of stacks of reserve shuttles corresponding by type of weft to the weaving shuttles in the shifting boxes, a pattern mechanism controlling the shifting of said shuttle boxes, means to transfer a shuttle from any of said stacks to the lay, a shiftable weft selector the position of which determines which stack of shuttles will be acted upon when said transfer means is actuated, means to shift the position of said selector when there is to be a box shift whereby said selector is always in register with the shuttle similar to that next to be picked from the shifting shuttle boxes before said shuttle is picked therefrom, detector mechanism to detect substantial weft exhaustion in the weaving shuttle at a time prior to the completion of said interval during which the shuttle boxes shift, means to actuate said transfer means, said actuating and transfer means normally disconnected, means actuated by said detector mechanism on indication of weft exhaustion to operatively couple said transfer means with said actuating means in the period of time between reception of an active shuttle in the shifting boxes and the next pick from said shifting boxes, providing the shuttle next to be picked is substantially exhausted of weft, for actuating of said transfer means, as controlled by said selector, to transfer from the magazine to the lay a reserve shuttle corresponding by type of weft to said substantially exhausted shuttle prior to the next pick after the picking of said substantially exhausted shuttle from the shifting shuttle boxes.

55. In a multicolor shuttle changing loom having a reciprocating lay and a plurality of shifting boxes at one end thereof provided with weaving shuttles and operating in successive cycles each comprising two complete successive reciprocations of the lay and in each cycle of which the shuttle boxes may be shifted relatively to the lay during an interval at the beginning of a cycle and starting substantially with the normal time of arrival of the active shuttle at the shifting shuttle box end of the lay and ending substantially when the lay next reaches picking position to place any one of the boxes in active position, a pattern mechanism to determine the sequence of movements of the shifting shuttle boxes, a magazine at the other end of the loom having a plurality of groups of reserve shuttles having wefts of distinctive types, there being a group to correspond to each of the shifting shuttle boxes, and means under control of the pattern mechanism operative during any given cycle and beginning its operation during the box shifting interval of the given cycle to select and thereafter transfer from the magazine to active position on the lay a reserve shuttle corresponding to an exhausted shuttle rendered active by a shifting of the boxes, to the end that shuttle changing operations involving different groups of reserve shuttles can occur in successive cycles.

56. In a multicolor shuttle changing loom having a reciprocating lay and a plurality of weaving shuttles grouped at one end of the lay during a regularly recurring shuttle shifting interval starting with the normal time of arrival of the active shuttle at said end of the lay and ending at the following pick of the loom, the loom operating in successive cycles each comprising two successive complete reciprocations of the lay and each cycle including and starting with the beginning of one of the shuttle shifting intervals, a reserve shuttle magazine to supply shuttles having wefts of different characteristics corresponding to the weaving shuttles, a weft detecting circuit for each weaving shuttle, a plurality of shifting shuttle boxes for the weaving shuttles any one of which may become active to place any selected weaving shuttle in active position at the end of a shuttle shifting interval while the remainder of the shuttle boxes and weaving shuttles are out of action, pattern mechanism to determine which of said weaving shuttles shall be active, means independent of the shifting shuttle boxes to cause said pattern mechanism to close the circuit of an exhausted shuttle in the shifting boxes during the shuttle shifting interval of a given cycle in which the exhausted shuttle becomes active, and means actuated by the closing of the circuit of the exhausted active shuttle to replace the active shuttle by a similar shuttle selected from the magazine and place the such selected shuttle in active position during that part of said given cycle following the closing of the circuit of the exhausted shuttle, to the end that shuttle changing operations involving different weaving shuttles can occur in successive cycles of two successive reciprocations of the lay.

57. In a multicolor shuttle changing loom having a reciprocating lay which reaches picking position during the rearward stroke thereof and having also a plurality of distinctive weaving shuttles, shifting shuttle boxes at one end of the lay shiftable during a box shifting interval starting substantially at the normal time of arrival of an active weaving shuttle at the shifting shuttle box end of the lay and ending when the lay reaches picking position on the following rearward stroke thereof, the loom operating in successive cycles each comprising two successive complete reciprocations of the lay, each cycle containing an aforesaid box shifting interval and starting at the beginning of the box shifting interval thereof, any weaving shuttle selected for action during a cycle to be picked twice successively during the cycle, pattern mechanism to control the shifting shuttle boxes and determine which weaving shuttle shall be selected for action prior to a box shifting interval, a magazine having groups of reserve shuttles corresponding in type to the weaving shuttles, weft detecting mechanism operative prior to the end of the box shifting interval in a given cycle to indicate weft exhaustion in the weaving shuttle to be in active position at the end of said interval, reserve shuttle selector mechanism for the magazine controlled by the pattern mechanism and effective prior to the end of the said interval of the given cycle to select a reserve shuttle from a group corresponding to the exhausted weaving shuttle which is selected for action by the pattern mechanism for said given cycle, and means to move the selected shuttle from the magazine to active picking position for picking when the lay reaches picking position the second time during the given cycle including said interval.

58. In a multicolor shuttle changing loom having a reciprocating lay which reaches picking position during the rearward stroke thereof and having also a plurality of distinctive weaving shuttles, shifting shuttle boxes at one end of the lay shiftable during a box shifting interval starting substantially at the normal time of arrival of an active weaving shuttle at the shifting shuttle box end of the lay and ending when the lay reaches picking position on the following rearward stroke thereof, the loom operating in successive cycles each comprising two successive complete reciprocations of the lay, each cycle containing an aforesaid box shifting interval and starting at the beginning of the box shifting interval thereof, any weaving shuttle selected for action during a cycle to be picked twice successively during the cycle, a magazine having groups of reserve shuttles corresponding in type to the weaving shuttles, weft detecting mechanism operative prior to the end of the box shifting interval in a given cycle to indicate weft exhaustion in the weaving shuttle to be in active position for the first pick of the given cycle, selector mechanism for the magazine controlled jointly by the pattern mechanism and weft detecting mechanism to initiate selection of a reserve shuttle from a group corresponding to the exhausted weaving shuttle during said interval and after the detector indicates weft exhaustion, and means to move the selected shuttle from the magazine to active picking position for the second pick of the given cycle.

59. In a multicolor shuttle changing loom having a reciprocating lay and a plurality of weaving shuttles grouped at one end of the lay during a regularly recurring shuttle shifting interval starting with the normal time of arrival of the active shuttle at said one end of the lay and ending at the following pick of the loom, the loom operating in successive cycles each comprising two successive complete reciprocations of the lay and each cycle including and starting with the beginning of one of said shuttle shifting intervals, a magazine having groups of reserve shuttles similar to the weaving shuttles, means to replace an active exhausted weaving shuttle with a fresh shuttle having the same character of weft drawn from the magazine during one of the aforesaid cycles and place said fresh shuttle in active position, a pattern chain movable at predetermined times and having a plurality of chain bars which move successively to control position one at a time, two separate devices to be controlled concurrently by each of said chain bars when in control position, one device comprising shifting shuttle boxes to control the shifting of the weaving shuttles relatively to the lay and move an exhausted shuttle to active position during the shuttle shifting interval of the aforesaid one cycle, and the other device being mechanism to initiate selection of a reserve shuttle from the magazine prior to the end of the shuttle shifting interval of said one cycle, both of said devices being controlled simultaneously by the same pattern chain bar in control position during said one cycle, to the end that the weaving shuttle in active position and the device to select the reserve shuttle are coordinated during said one cycle.

60. In a multicolor shuttle changing loom having a reciprocating lay and a plurality of weaving shuttles grouped at one end of the lay during a regularly recurring shuttle shifting interval starting with the normal time of arrival of the active shuttle at said one end of the lay and ending at the following pick of the loom, the loom operating in successive cycles each comprising two successive complete reciprocations of the lay and each cycle including and starting with the beginning of one of said shuttle shifting intervals, a magazine having groups of reserve shuttles corresponding to the weaving shuttles, weft detecting mechanism, a pattern chain movable at predetermined times and having a plurality of separate chain bars which move successively to control position one at a time, two separate devices to be controlled concurrently by each of said chain bars when in control position, one of said devices comprising shifting shuttle boxes to control the shifting of the weaving shuttles relatively to the lay and move an exhausted shuttle to active position during the shuttle shifting interval of a given cycle, the other device comprising means to cause the weft detector mechanism to detect the weft in the exhausted shuttle caused to be active by the first device prior to the end of the shuttle shifting interval of said given cycle and initiate selection of a reserve shuttle from a group of the magazine corresponding to the exhausted shuttle immediately after the weft detector mechanism indicates weft exhaustion in the active exhausted shuttle, and mechanism operative within said given cycle to move the selected reserve shuttle to active position on the lay.

61. In a multicolor shuttle changing loom having a reciprocating lay and a plurality of weaving shuttles grouped at one end of the lay during a regularly recurring shuttle shifting interval starting with the normal time of arrival of the active shuttle at said one end of the lay and ending at the following pick of the loom, the loom operating in successive cycles each comprising two successive complete reciprocations of the lay and each cycle including and starting with the beginning of one of said shuttle shifting intervals, a magazine having groups of reserve shuttles corresponding to the weaving shuttles, weft detector mechanism capable of indicating weft exhaustion in any exhausted weaving shuttle which is active during a cycle, a pattern chain movable at predetermined times and having a plurality of separate chain bars which move successively to control position one at a time, a plurality of separate means to be controlled concurrently by each pattern chain bar when in control position, one means comprising shifting shuttle boxes to control the shifting of the weaving shuttles relatively to the lay and move an exhausted weaving shuttle to active position during the shuttle shifting interval of one of said cycles, another means comprising weft detector mechanism which indicates exhaustion of weft in the exhausted active shuttle prior to the completion of the shuttle shifting interval of said one cycle which places the exhausted shuttle in active position, and still other means controlled by the pattern chain bar in control position through the detector mechanism comprising mechanism to select a reserve shuttle from the magazine corresponding to the exhausted active shuttle during a part of said one cycle immediately following indication of weft exhaustion by the detector mechanism, to the end that the exhausted active shuttle giving indication of weft exhaustion during the first part of said one cycle corresponds to the reserve shuttle selected from the magazine in the same cycle, and mechanism operative within said one cycle to move the selected reserve shuttle to active position, any pattern chain bar in control position exercising concurrent control over the active shuttle and the weft detector mechanism and the selection of the reserve shuttle.

RICHARD GREENLEAF TURNER.